United States Patent
Velev et al.

(10) Patent No.: US 12,225,492 B2
(45) Date of Patent: Feb. 11, 2025

(54) PAGING FOR MULTIPLE SIMS

(71) Applicant: Lenovo (Singapore) PTE. LTD., New Tech Park (SG)

(72) Inventors: Genadi Velev, Darmstadt (DE); Apostolis Salkintzis, Athens (GR); Andreas Kunz, Ladenburg (DE)

(73) Assignee: Lenovo (Singapore) Pte. Ltd., New Tech Park, Singapore (SG)

( * ) Notice: Subject to any disclaimer, the term of this patent is extended or adjusted under 35 U.S.C. 154(b) by 311 days.

(21) Appl. No.: 17/768,214

(22) PCT Filed: Oct. 11, 2019

(86) PCT No.: PCT/EP2019/077666
§ 371 (c)(1),
(2) Date: Apr. 11, 2022

(87) PCT Pub. No.: WO2021/069085
PCT Pub. Date: Apr. 15, 2021

(65) Prior Publication Data
US 2023/0093965 A1  Mar. 30, 2023

(51) Int. Cl.
*H04W 68/12* (2009.01)
*H04W 60/00* (2009.01)
*H04W 8/18* (2009.01)

(52) U.S. Cl.
CPC ......... *H04W 60/005* (2013.01); *H04W 68/12* (2013.01); *H04W 8/18* (2013.01)

(58) Field of Classification Search
CPC .............................. H04W 60/00; H04W 68/12
See application file for complete search history.

(56) References Cited

U.S. PATENT DOCUMENTS 9,813,989 B2  11/2017  Su et al.
2014/0274047 A1  9/2014  Dhanda et al.
(Continued)

FOREIGN PATENT DOCUMENTS

KR  1020190060667 A  6/2019
WO  2012177492 A1  12/2012
(Continued)

OTHER PUBLICATIONS

PCT/EP2019/077666, "Notification of Transmittal of the International Search Report and the Written Opinion of the International Searching authority, or the Declaration", International Searching Authority, Mar. 26, 2020, pp. 1-21.
(Continued)

*Primary Examiner* — Michael T Vu
(74) *Attorney, Agent, or Firm* — Kunzler Bean & Adamson

(57) ABSTRACT

Apparatuses, methods, and systems are disclosed for paging multi-SIM devices in the same network. One apparatus includes a first subscriber identity module ("SIM"), a second SIM, a processor and a transceiver that communicates with at least one communication network. The processor registers with a first communication network using the first SIM and registers with a second communication network using the second SIM. Here, the registration with the first communication network is associated with a first identifier, wherein registering with the second communication network includes indicating the first identifier to the second communication network upon determining that the first communication network and the second communication network are the same communication network.

20 Claims, 12 Drawing Sheets

(56) References Cited

U.S. PATENT DOCUMENTS

| | | | |
|---|---|---|---|
| 2015/0245309 A1 | 8/2015 | Nayak et al. | |
| 2017/0244705 A1 | 8/2017 | Ha et al. | |
| 2019/0007500 A1 | 1/2019 | Kim et al. | |
| 2019/0045476 A1* | 2/2019 | He | H04L 45/745 |
| 2019/0124561 A1 | 4/2019 | Faccin et al. | |
| 2020/0037281 A1* | 1/2020 | Lee | H04W 36/00226 |
| 2020/0053545 A1* | 2/2020 | Wong | H04W 8/08 |

FOREIGN PATENT DOCUMENTS

| | | |
|---|---|---|
| WO | 2015171247 A1 | 11/2015 |
| WO | 2017128650 A1 | 8/2017 |
| WO | 2018161796 A1 | 9/2018 |
| WO | 2019076439 A1 | 4/2019 |
| WO | 2019120477 A1 | 6/2019 |

OTHER PUBLICATIONS

3GPP, "3rd Generation Partnership Project; Technical Specification Group Services and System Aspects; System architecture for the 5G System (5GS); Stage 2 (Release 16)", 3GPP TS 23.501 V16.3.0, Dec. 2019, pp. 1-417.

Intel, "PLMN selection and cell (re-)selection for dual-registration mode", 3GPP TSG-CT WG1 Meeting #109 C1-181605, Feb. 26-Mar. 2, 2018, pp. 1-7.

\* cited by examiner

PAGING FOR MULTIPLE SIMS

The subject matter disclosed herein relates generally to wireless communications and more particularly relates to paging multi-SIM devices in the same network.

BACKGROUND

The following abbreviations and acronyms are herewith defined, at least some of which are referred to within the following description.

Third Generation Partnership Project ("3GPP"), Fifth-Generation Core ("5GC"), Fifth-Generation QoS Indicator ("5QI"), Access and Mobility Management Function ("AMF"), Access Point Name ("APN"), Access Stratum ("AS"), Access Traffic Steering, Switching and Splitting ("ATSSS"), Allocation/Retention Policy ("ARP"), Application Programing Interface ("API"), Common Search Space ("CSS"), Data Network Name ("DNN"), Data Radio Bearer ("DRB"), Differentiated Services Code Point ("DSCP"), Downlink ("DL"), Enhanced Mobile Broadband ("eMBB"), Encapsulating Security Payload ("ESP"), Evolved Node-B ("eNB"), Evolved Packet Core ("EPC"), Evolved UMTS Terrestrial Radio Access Network ("E-UTRAN"), European Telecommunications Standards Institute ("ETSI"), Globally Unique Temporary UE Identity ("GUTI"), General Packet Radio Service ("GPRS"), GPRS Tunneling Protocol ("GTP", GTP-C refers to control signal tunneling while GTP-U refers to user data tunneling), Home Subscriber Server ("HSS"), Internet-of-Things ("IoT"), IP Multimedia Subsystem ("IMS," aka "IP Multimedia Core Network Subsystem"), Internet Protocol ("IP"), Key Performance Indicators ("KPI"), Licensed Assisted Access ("LAA"), Load Based Equipment ("LBE"), Listen-Before-Talk ("LBT"), Long Term Evolution ("LTE"), LTE Advanced ("LTE-A"), Medium Access Control ("MAC"), Multiple Access ("MA"), Modulation Coding Scheme ("MCS"), Machine Type Communication ("MTC"), Massive MTC ("mMTC"), Mobile Network Operator ("MNO"), Mobility Management ("MM"), Mobility Management Entity ("MME"), Multiple Input Multiple Output ("MIMO"), Multipath TCP ("MPTCP"), Multi User Shared Access ("MUSA"), Non-Access Stratum ("NAS"), Narrowband ("NB"), Network Function ("NF"), Network Access Identifier ("NAI"), Next Generation (e.g., 5G) Node-B ("gNB"), Next Generation Radio Access Network ("NG-RAN"), New Radio ("NR"), Policy Control & Charging ("PCC"), Policy Control Function ("PCF"), Policy Control and Charging Rules Function ("PCRF"), Packet Data Network ("PDN"), Packet Data Unit ("PDU"), PDN Gateway ("PGW"), Public Land Mobile Network ("PLMN"), Quality of Service ("QoS"), QoS Class Identifier ("QCI"), Registration Area ("RA"), Radio Access Network ("RAN"), Radio Access Technology ("RAT"), Radio Resource Control ("RRC"), Receive ("RX"), Single Network Slice Selection Assistance Information ("S-NSSAI"), Scheduling Request ("SR"), Secure User Plane Location ("SUPL"), Serving Gateway ("SGW"), Session Management Function ("SMF"), Stream Control Transmission Protocol ("SCTP"), System Information Block ("SIB"), Tracking Area ("TA"), Transmission Control Protocol ("TCP"), Transmit ("TX"), Unified Data Management ("UDM"), User Entity/Equipment (Mobile Terminal) ("UE"), Uplink ("UL"), User Plane ("UP"), Universal Mobile Telecommunications System ("UMTS"), Ultra-reliability and Low-latency Communications ("URLLC"), User Datagram Protocol ("UDP"), UE Route Selection Policy ("URSP"), Unstructured Supplementary Service Data (USSD), Wireless Local Area Network ("WLAN"), and Worldwide Interoperability for Microwave Access ("WiMAX").

Certain UEs support multiple subscriber identity modules, e.g., USIM-1 and USIM-2, to same MNO or different MNOs. The following modes of operation of Multi/Dual-USIM devices are defined in GSMA TS.37 document: Passive, Dual-SIM/Dual-Standby, and Dual-SIM/Dual-Active.

In Passive mode the UE contains two SIMs, but only one can be selected for use at any given time. Passive Dual SIM devices are effectively a single SIM device as the SIMs share a single transceiver and the UE only has logical connection to a single network at any given time. With other words, only a single USIM module/profile is registered in a given time.

In Dual SIM Dual Standby (DSDS) mode both SIMs can be used for idle-mode network connection, but when a radio connection is active the second connection is disabled. As in the passive case, the SIMs in a DSDS device share a single transceiver. Through time multiplexing two radio connections are maintained in idle mode. When in-call on network for one SIM it is no longer possible to maintain radio connection to the network of the second SIM, hence that connection is unavailable for the duration of the call. Registration to the second network is maintained. The UE is to maintain idle operation on one subscription while on a best effort data connection on the other subscription.

Dual SIM Dual Active (DSDA): both SIMs can be used in both idle and connected modes. Each SIM has a dedicated transceiver, meaning that there are no interdependencies on idle or connected mode operation at the modem level. Note that in some DSDA devices the second transceiver may be 2G-only.

BRIEF SUMMARY

Methods for paging multi-SIM devices in the same network are disclosed. Apparatuses and systems also perform the functions of the methods.

One method of a network device (e.g., AMF) includes receiving a registration request initiating a first registration to register a UE with a communication network using a first SIM in the UE and determining that the UE is registered with the communication network via a second registration using a second SIM in the UE. The method includes identifying a MM function serving the second registration and determining whether the MM function is able to serve the first registration. The method includes initiating a relocation to transfer the first registration to the MM function in response to determining that the MM function is able to serve the first registration and updating a MM context in the MM function corresponding to the second registration to contain an identifier of first registration, in response to determining that the MM function is unable to serve the first registration.

Another method of a network device (e.g., AMF and/or RAN node) includes receiving a paging request message for a first SIM of a UE, wherein the UE is registered with a communication network using the first SIM and using a second SIM. The method includes identifying an activated service of the second registration of the UE using the second SIM in response to the paging request for the first registration and determining whether to send a paging message towards the UE using the first SIM based on the activated service of the second registration.

One method of a UE includes supporting a first SIM and a second SIM, registering with a first communication network using the first SIM, wherein the registration with first SIM is associated with a first temporary identifier, and registering with a second communication network using the second SIM, wherein registering the second SIM includes indicating the first temporary identifier to the second communication network upon determining that the first communication network and second communication network are being registered to the same communication network.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
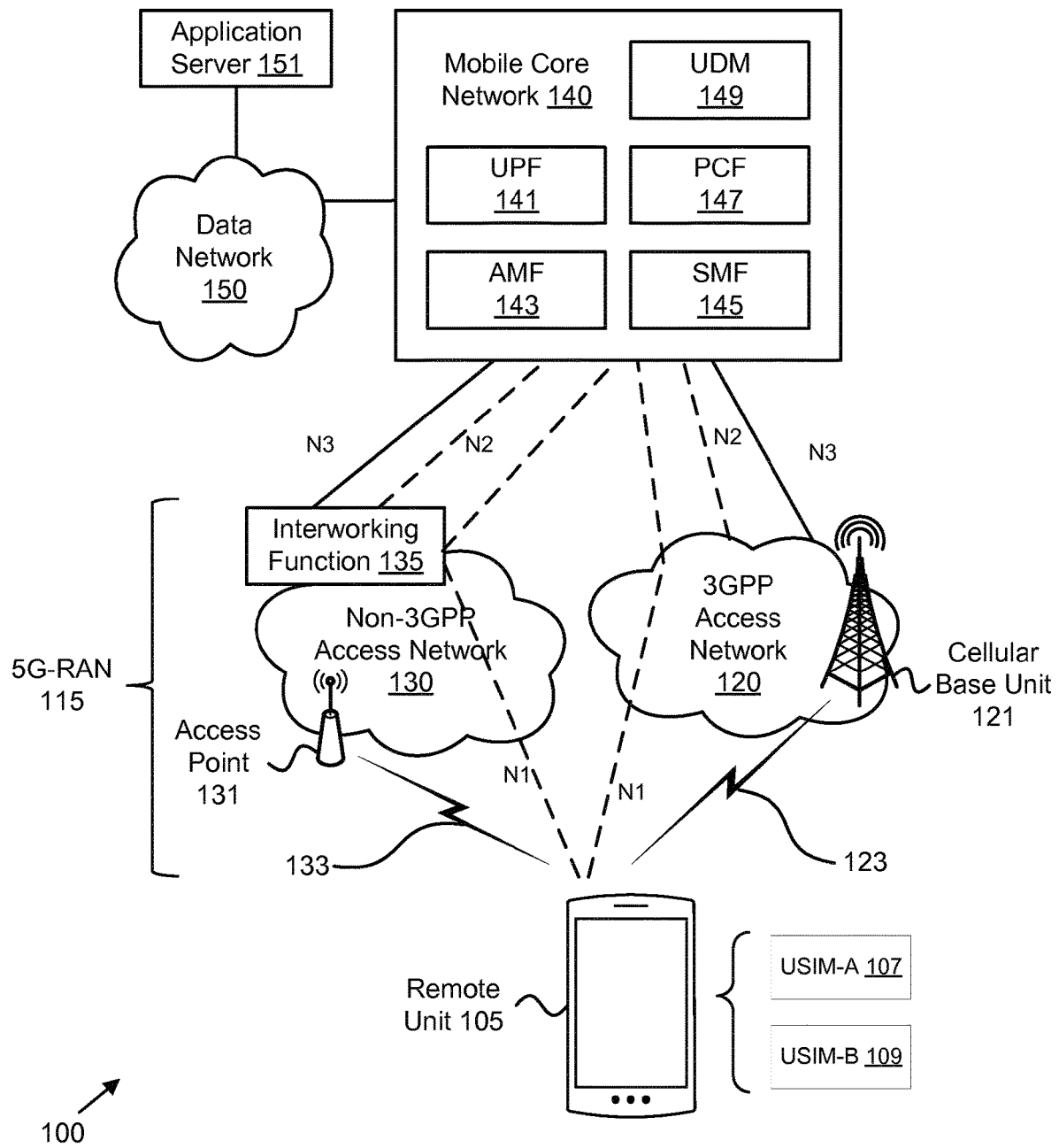
FIG. 1 is a schematic block diagram illustrating one embodiment of a wireless communication system for paging multi-SIM devices in the same network.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for paging multi-SIM devices in the same network. In various embodiments, the disclosure introduces enhancements to DSDS mode of operation for a multi-SIM UE, where the UE can dynamically decide which connection to use, e.g., connection for USIM-A or connection for USIM-B, independent whether there is already any existing connection to any USIM. Note that "existing connection" means, e.g., an existing NAS connection where the UE is in CM-Connected state for one USIM.

As specified in TS 23.501, the following definitions are described for the 5G-GUTI:

$$<5G\text{-}GUTI>:=<GUAMI><5G\text{-}TMSI>$$

where GUAMI identifies one or more AMF(s).

When the Globally Unique AMF ID (GUAMI) identifies only one AMF, the 5G-TMSI identifies the UE uniquely within the AMF. However, when AMF assigns a 5G-GUTI to the UE with a GUAMI value used by more than one AMF, the AMF shall ensure that the 5G-TMSI value used within the assigned 5G-GUTI is not already in use by the other AMF(s) sharing that GUAMI value.

The GUAMI is to be structured as:

$$<GUAMI>:=<MCC><MNC><AMF\ Region\ ID><AMF\ Set\ ID><AMF\ Pointer>$$

where AMF Region ID identifies the region, AMF Set ID uniquely identifies the AMF Set within the AMF Region and AMF Pointer identifies one or more AMFs within the AMF Set.

The present disclosure assumes that a UE has multiple SIMs (e.g., USIM-1 and USIM-2) and the UE attempts registration/attachment for both SIMs to the same MNO. It is also assumed that both USIMs in the UE share a single Tx module, which means that the UE cannot simultaneously communicate for services associated with both USIMs. In other words, the UE cannot simultaneously perform data communication for USIM-1 and voice communication for USIM-2.

It is assumed that the UE is configured with service associated with a particular SIM and services prioritization (e.g., done by USIM configuration or user preferences or both). For example, the USIM-1 may be associated with "data services", whereas the USIM-2 is associated with IMS/CS voice/SMS services which are prioritized over the services from USIM-1. It is further assumed that there are means (in the UE internally, but also the signaling between UE and network) to set up the prioritization of services associated with USIM-1 and USIM-2. Additionally, is it assumed that the CN paging message contains a cause value including the type of service.

Disclosed herein are solutions for how to deliver the paging for one USIM (e.g., for USIM-1) while the UE is in Connected state with the other USIM (e.g., USIM-2). In particular, the problem is that the UE may not be able to receive the paging message for USIM-1 because the radio resources are occupied by the active communication with USIM-2. Also disclosed are solutions that minimize the signaling (in the network and over Uu interface) for paging a MUSIM UE. Please note that if a MUSIM UE operates in DSDS mode and there is an active connection to USIM-1, the connection associated with USIM-2 is disabled and the MUSIM UE is not able to receive the paging for e.g., USIM-2. If the network sends the Paging for USIM-2, the UE may not be able to receive the Paging. That would result in unnecessary Paging of the UE and unnecessary network and radio resource usage.

To optimize paging for the MUSIM UE, the network associates the UE's Mobility Management (MM) contexts for the multiple USIMs (i.e., the UE's MM contexts in the serving mobility NF, e.g., AMFs or MMEs). Before initiating the core network paging to the UE, the network checks the connection management (CM) state of the associated MM context. In particular, this solution is applicable if the UE is registered for USIM-1 and for USIM-2 with the same network where either a common mobility serving NF can be found, or mobility serving NFs can easily exchange with each other. However, it is also possible to use the solution, when the UE is registered for USIM-1 and for USIM-2 with the different networks where signaling exchange between the mobility serving NFs is possible.

In a first aspect, the UE registers with the network for the first USIM (USIM-1) and then registers with the network for the second USIM (USIM-2). In a second aspect, upon determining that the serving PLMN for USIM-1 and USIM-2 registrations are the same, the UE transmits an identifier (e.g., GUTI) received during the registration of the first USIM (USIM-1).

In a third aspect, the mobility serving NF (e.g., AMF-2 or MME-2) that is initially selected during the registration of USIM-2 checks whether the mobility serving NF of the USIM-1's registration (e.g., AMF-1 or MME-1) can serve the USIM-2's registration. For example, whether the 'potentially' Allowed NSSAI for USIM-2 can be also served by AMF-1.

In a fourth aspect, if AMF-1 can serve the USIM-2's registration, and if AMF relocation is possible, then an AMF relocation procedure is carried out and the AMF-2 is relocated to AMF-1, thus, both registrations are served by AMF-1. Otherwise, the USIM-1 and USIM-2 registrations are kept in distinct AMFs, but the AMFs exchange signaling (e.g., between AMF-1 and AMF-2) to establish an association between the USIM-1's MM context in AMF-1 and USIM-2's MM context in AMF-2. For example, if the USIM-1's MM context is in CM-IDLE state and MT service should be initiated, then AMF-1 requests from AMF-2 at least a) the CM state and/or b) the activated services type in order to determine whether to send paging request message to the UE using USIM-1.

In a fifth aspect, during paging, if MT data should be delivered to UE using USIM-1 and the UE is in CM-IDLE state for USIM-1, then the AMF-1 checks the UE's MM context in AMF-2 to determine at least if 1) the UE is in CM-CONNECTED state or in CM-IDLE state for USIM-2 and 2) which services are currently activated for USIM-2.

Here, the AMF-1 may decide to page or not page the UE depending on one or more of the following criteria: A) If the UE is in CM-Connected state for USIM-2 and the activated services used for USIM-2 are of higher priority (e.g., emergency, MPS, MCS) than the MT services triggering the paging for USIM-1, the AMF-1 may decide to not page the UE; B) If the UE is in CM-Connected state for USIM-2 and/or the services used for USIM-2 are of normal or low priority (e.g., default data services, IMS services), the AMF-1 may decide to page the UE (the MT service for USIM-1 can be e.g., with normal priority (e.g., data service or IMS service) or of higher priority (e.g., emergency service or MPS service or MCS)). In this case the AMF-1 may provide to the RAN the UE identifier of the second MM context (UE using the USIM-2) which allows to schedule the radio resources in the RAN for the UE using USIM-2 in such that the UE using USIM-1 is able to receive the paging message; and C) If the UE is in CM-Idle state for USIM-2 or CM-Connected with RRC-Inactive state, the AMF-1 may decide to page the UE.

In embodiments of the fifth aspect, not paging the UE using USIM-1 results in changing the USIM-1 connection state to temporarily unreachable. The AMF-1 may store the paging request (depending on the MT service) until the UE becomes reachable. For example, the AMF-1 may subscribe to receive a notification from AMF-2 when the UE transfers to CM-Idle state for USIM-2.

The MM context for the UE using USIM-1 in AMF-1 may maintain a suspended connection/communication state, e.g., the UE has requested a connection suspension due to the use of services for other USIM. If the MT services for USIM-1 are of high-priority (e.g., emergency, MPS or MCS), the AMF-1 may decide to page the UE despite the suspended connection mode. In such case, the AMF-1 may include an indication for priority service (or other paging cause information indicating the paging priority) in the Paging message.

In a sixth aspect, when the AS layer in the UE forwards the paging message to the NAS layer, usually the NAS layer performs Service Request procedure by sending NAS Service Request message to the network. A new enhancement is proposed, that upon successful registration with multiple USIM modules, the NAS layer of each USIM module (i.e., each NAS protocol stack) is configured to store the paging message/indication and to indicate a) the request for MT service and b) the service type to the user of the device (e.g., via graphical-user-interface, GUI) or to higher-layers. The user of the device determines whether to accept or reject the MT service. The NAS layer is instructed via the user interaction whether to respond with Service Request procedure (i.e., MT service is accepted) or to ignore the paging message (i.e., MT service is rejected).

If the first NAS layer serving the USIM-1 is instructed to respond with Service Request procedure, the NAS layer may first instruct the second NAS layer serving the USIM-2 to terminate the NAS connection (e.g., to initiate a NAS suspension request procedure).

Regarding the paging decision criteria of the fifth aspect, the AMF may know one or more of the following MT service types: voice call (IMS or non-IMS), MT SMS or USSD (IMS or non-IMS), NAS protocols downlink signaling, non-delay critical DL data, delay-critical or priority MT service, etc. The 'service type' values can be standardized (i.e., the UE would know the service type meaning when manufactured) and/or operator-specific values (i.e., each operator may use specific values, which need to be configured in the UE, possibly during Registration procedure when MUSIM capabilities/support is exchanged). Based on this information in the AMF for the MT service types for first USIM (e.g., USIM-1) in CM-Idle state, the AMF can compare with the service types for the second USIM (e.g., USIM-2) registration and decide whether to page or not the UE using the first USIM.

Please note that the UE may be in CM-Idle state for the second USIM as well, but there may be ongoing paging for the second USIM. In this case, the AMF may compare the MT services for USIM-1 with the MT services (which already caused the paging) for the USIM-2.

The features described above can be called paging optimizations for MUSIM UE (particularly in the case where the UE registers with multiple USIMs to the same serving PLMN, but the paging optimizations for MUSIM UE can be applicable also if the UE registers with multiple USIMs to the different serving PLMNs). If the network does not receive an indication for MUSIM capability support from the UE (e.g., during a NAS Registration procedure), the network may decide not to apply the paging optimizations for MUSIM UE.

FIG. 1 depicts a wireless communication system 100 for paging multi-SIM devices in the same network, according to embodiments of the disclosure. In one embodiment, the wireless communication system 100 includes at least one remote unit 105, a 5G-(R)AN 115, and a mobile core network 140. The 5G-(R)AN 115 and the mobile core network form a mobile communication network. The 5G-(R)AN 115 may be composed of a 3GPP access network 120 containing at least one cellular base unit 121 and/or a non-3GPP access network 130 containing at least one access point 131. The remote unit communicates with the 3GPP access network 120 using 3GPP communication links 123 and communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE/EPC (referred as 4G) or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with an application server 151 (or other communication peer) via a network connection with the mobile core network 140. For example, an application in a remote unit 105 (e.g., web browser, media client, telephone/VoIP application) may trigger the remote unit 105 to establish a PDU session (or other data connection) with the mobile core network 140 using the 5G-(R)AN 115 (e.g., a 3GPP access network 120 and/or a non-3GPP access network 130). The mobile core network 140 then relays traffic between the remote unit 105 and the data network 150 (e.g., application server 151) using the PDU session. Note that the remote unit 105 may establish one or more PDU sessions (or other data connections) with the mobile core network 140. As such, the remote unit 105 may have at least one PDU session for communicating with the data network 150. The remote unit 105 may establish additional PDU sessions for communicating with other data network and/or other communication peers.

The cellular base units 121 may be distributed over a geographic region. In certain embodiments, a cellular base unit 121 may also be referred to as an access terminal, a base, a base station, a Node-B, an eNB, a gNB, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121.

The non-3GPP access networks 130 may be distributed over a geographic region. Each non-3GPP access network 130 may serve a number of remote units 105 with a serving area. Typically, a serving area of the non-3GPP access network 130 is smaller than the serving area of a cellular base unit 121. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking function 135. The interworking function 135 provides interworking between the remote unit 105 and the mobile core network 140. In some embodiments, the interworking function 135 is a Non-3GPP Interworking Function ("N3IWF") and, in other embodiments, it is a Trusted Non-3GPP Gateway Function ("TNGF"). The N3IWF supports the connection of "untrusted" non-3GPP access networks to the mobile core network (e.g., 5GC), whereas the TNGF supports the connection of "trusted" non-3GPP access networks to the mobile core network. The interworking function 135 supports connectivity to the mobile core network 140 via the "N2" and "N3" interfaces, and it relays "N1" signaling between the remote unit 105 and the AMF 143. As depicted, both the 3GPP access network 120 and the interworking function 135 communicate with the AMF 143 using a "N2" interface. The interworking function 135 also communicates with the UPF 141 using a "N3" interface.

In certain embodiments, a non-3GPP access network 130 may be controlled by an MNO of the mobile core network 140 and may have direct access to the mobile core network 140. Such a non-3GPP AN deployment is referred to as a "trusted non-3GPP access network." A non-3GPP access network 130 is considered as "trusted" when it is operated by the MNO, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network.

In one embodiment, the mobile core network 140 is a 5G core ("5GC") or the evolved packet core ("EPC"), which may be coupled to a data network (e.g., the data network 150, such as the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs"). Here, the mobile core network 140 includes at least a UPF 141 that serves the 3GPP access network 120 and the non-3GPP access network 130. Note that in certain embodiments, the mobile core network may contain one or more intermediate UPFs, for example a first intermediate UPF that serves the non-3GPP access network 130 and the second intermediate UPF that serves the 3GPP access network 120. In such embodiments, the UPF 141 would be an anchor UPF receiving UP traffic of both intermediate UPFs.

The mobile core network 140 also includes multiple control plane functions including, but not limited to, an Access and Mobility Management Function ("AMF") 143 that serves both the 3GPP access network 120 and the non-3GPP access network 130, a Session Management Function ("SMF") 145, a Policy Control Function ("PCF") 147, and a Unified Data Management function ("UDM") 149. In certain embodiments, the mobile core network 140 may also include an Authentication Server Function ("AUSF"), a Network Repository Function ("NRF") (used by the various NFs to discover and communicate with each other over APIs), or other NFs defined for the 5GC.

In various embodiments, the mobile core network 140 supports different types of mobile data connections and different types of network slices, wherein each mobile data connection utilizes a specific network slice. Each network slice includes a set of CP and UP network functions, wherein each network slice is optimized for a specific type of service or traffic class. The different network slices are not shown in FIG. 1 for ease of illustration, but their support is assumed. In one example, each network slice includes an SMF and a UPF, but the various network slices share the AMF 143, the PCF 147, and the UDM 149. In another example, each network slice includes an AMF, an SMF and a UPF.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like.

As depicted, the remote unit 105 includes the USIM-A 107 and the USIM-B 109. For ease of illustration, the USIM-A 107 and USIM-B 109 are depicted as associated with the same PLMN. Moreover, the USIM-A 107 and USIM-B 109 may be associated with the same or different network slices of the same PLMN. In such a situation, the PLMN may interpret the remote unit 105 as two different remote units having each own registration with the network. In other embodiments, the USIM-A 107 and USIM-B 109 may be associated with different PLMNs.

Where the USIM-A 107 and USIM-B 109 are registered with the same PLMN (e.g., same HPLMN or same VPLMN), then paging optimizations may be applied as described herein. In various embodiments, during the process of registering USIM-B 109 the AMF 143 is able to determine whether another AMF in the mobile core network 140 is already used for the first USIM (USIM-A 107) registration is appropriate to serve the second USIM (USIM-B 109) registration.

In certain embodiments, the AMF 143 may receive a 'suggested AMF' indication from the mobile core network 140, as described below with reference to FIG. 3A. The AMF 143 is able to update the MM contexts for USIM-A 107 and USIM-B 109 to include the MM context identifier of the other MM context, regardless of whether the MM contexts are held in the same AMF or different AMFs of the mobile core network 140.

During network-initiated paging, the AMF 143 determines whether to page or not page the remote unit 105 depending on one or more of the paging decision criteria of the fifth aspect. If different AMFs serve the USIM-1 and USIM-2 MM contexts, then the AMF 143 (which is about to send the paging message for MT service) requests from the other AMF at least a) the CM state and/or b) the activated services type in order to determine whether to send paging request message to the USIM-1.

In certain embodiments, the base unit 121 may determine which actions to take upon Paging request message depending on the presence of UE context for another USIM (UE-ID_USIM-2). The base unit 121 may further determine whether the service type of the Paging request for USIM-B 109 is higher or lower priority compared to the services ongoing for USIM-A 107 and determine whether to transmit the paging message based on comparing the services. As described in further detail below with reference to FIG. 4B, the base unit 121 may use the additional parameter UE-ID_USIM-B to 1) identify the UE radio context for the remote unit 105 with UE-ID_USIM-B and 2) schedule radio resources for USIM-A 107 (e.g., creating service gap) to not overlap with Paging resources for USIM-B 109.

In various embodiments, the remote unit 105 is able to determine whether a second registration for another USIM profile (e.g., for USIM-B 109) is towards the same PLMN as the first registration (e.g., for USIM-A 107); request the User consent to reveal to the network operator whether USIM-1 and USIM-2 belong to the same UE or same user; and indicate to the network (e.g., in Registration request message to AMF) the identifier (e.g., GUTI) of already available registration.

Upon successful registration with multiple USIM modules, the NAS layer of each USIM module (i.e., each NAS protocol stack) is configured to store the paging message/indication and to indicate a) the request for MT service and b) the service type to the user of the device (e.g., by using a graphical user interface, GUI). The user determines whether to accept or reject the MT service. The NAS layer is instructed via the user interaction whether to respond with a Service Request procedure (i.e., MT service is accepted) or to ignore the paging message (i.e., MT service is rejected).

Additional details for paging multi-SIM devices in the same network are discussed below.

Figure 2A:
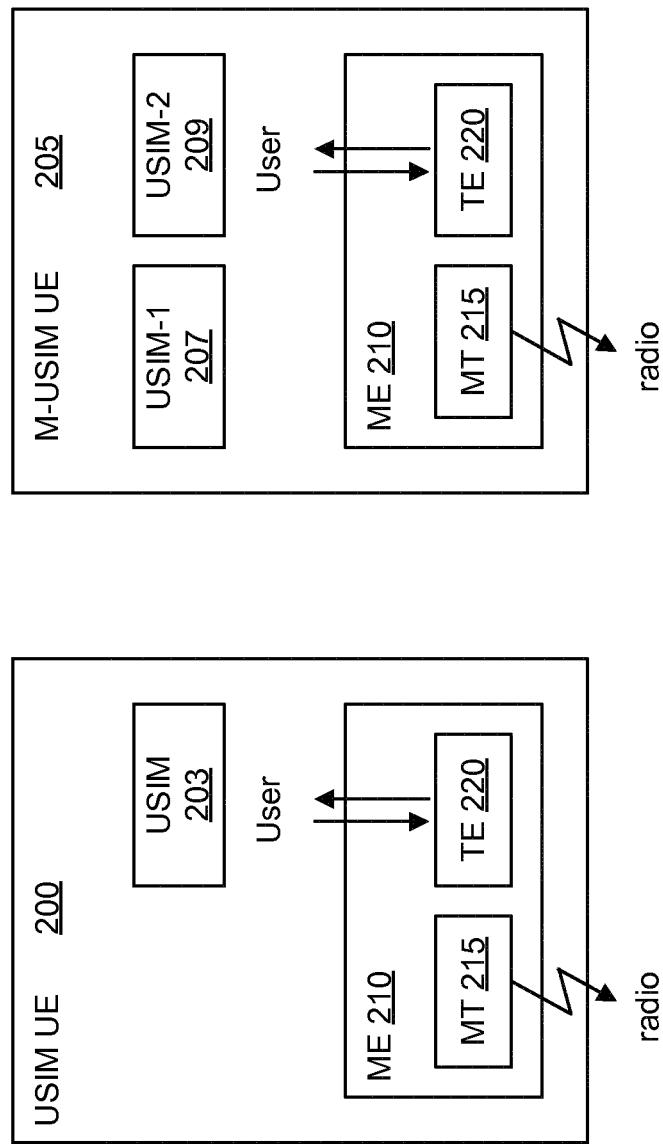
FIG. 2A is a block diagram illustrating one embodiment of a single USIM UE and a multi-USIM UE.

FIG. 2A depicts both a single USIM UE 200 and a multi-USIM UE 205, according to embodiments of the disclosure. The UE 200 comprises a Mobile Equipment ("ME") 210 with a single USIM 203 registered for use at a time, while the multi-USIM UE 205 includes an ME with multiple USIMs (e.g., a first USIM (USIM-1) 207 and a second USIM (USIM-2) 209) registered for use at the same time. The USIM-1 207 and USIM-2 209 may be associated with the same PLMN or different PLMNs. Moreover, the USIM-1 207 and USIM-2 209 may be associated with different network slices of the same PLMN. Note that both USIM-1 207 and USIM-2 209 can be used for idle mode network connection at the same time.

Each ME 210 (e.g., transceiver or modem) includes (1) one or more Mobile Terminations (MT) 215 specific to management of the PLMN access interface (3GPP or non-3GPP); and (2) one or more Terminal Equipment (TE) 220 functions necessary for the operation of the access protocols by the user. Please note that the UE 200 and multi-USIM UE 205 can implement the universal subscriber identity module(s) ("USIM", sometimes referred as subscriber identification module, "SIM") as an integrated circuit or card which needs to be inserted in the UE, and/or as embedded-SIM ("eSIM") or embedded universal integrated circuit card ("eUICC")—a form of programmable SIM that is embedded directly into a device, and/or the USIM profile can be stored on tamper-resistant platform or secure domain on the device. The USIM profile can be at least one of non-telecom profile, operational profile, a provisioning profile or a test profile.

Figure 2B:
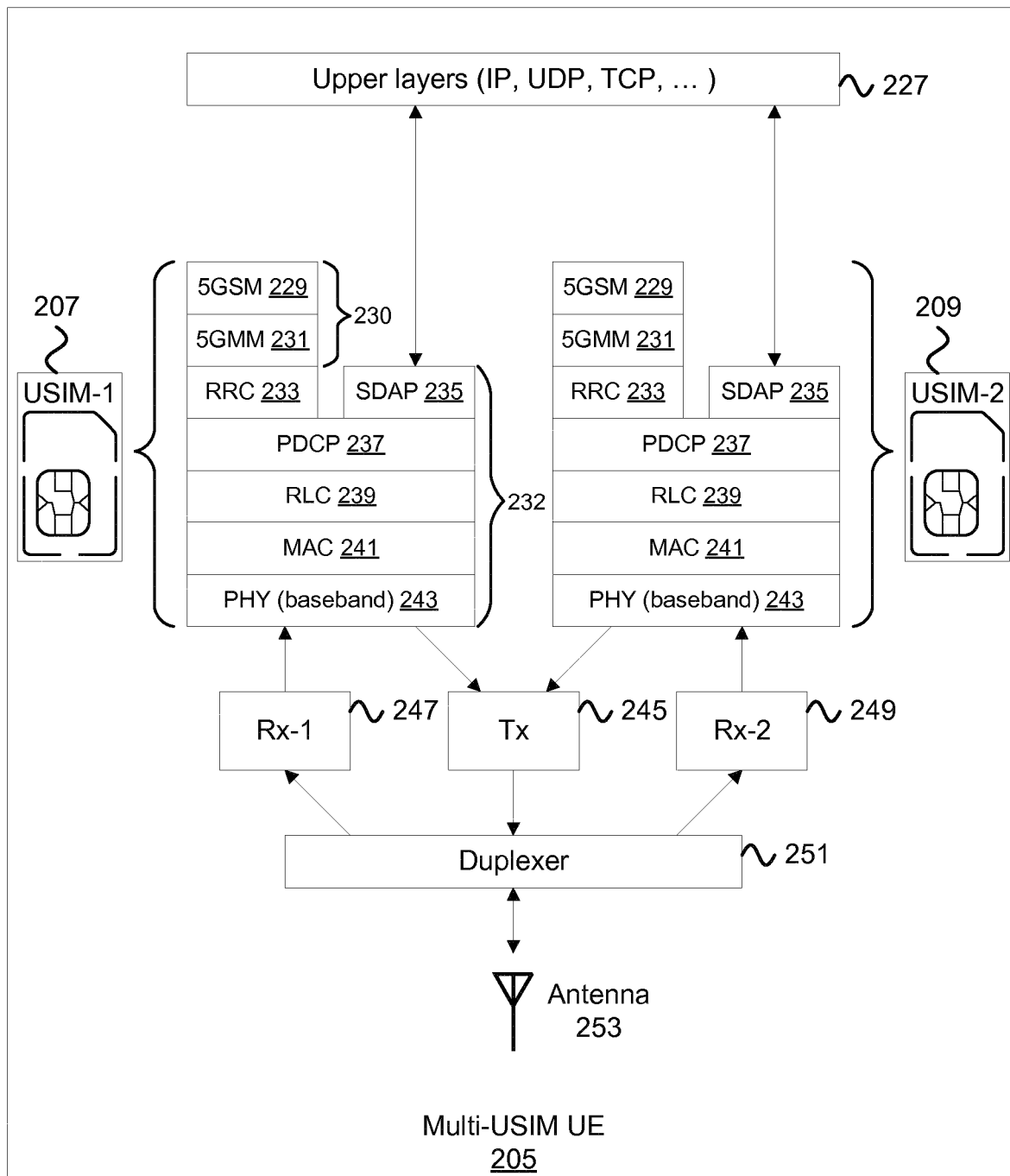
FIG. 2B is a block diagram illustrating one embodiment of a protocol stack of a multi-USIM UE.

FIG. 2B depicts a protocol stack 225 of the multi-USIM UE 205. The protocol stack 225 includes the upper layers 227 (e.g., IP layer, transport (UDP, TCP) layer(s), etc.). The protocol stack 225 includes the 5GS Session Management ("5GSM") sublayer 229 and the 5GS Mobility Management ("5GMM") sublayer 231, which comprise the NAS layer 230. Note that the AMF 143 includes a NAS layer may establish a NAS signaling connection with the multi-USIM UE 205. The AS layer 232 (also referred to as the "Radio Protocol" of the protocol stack 225 includes the RRC layer 233, the Service Data Adaptation Protocol ("SDAP") layer 235, the PCDP layer 237, the RLC layer 239, the MAC layer 241, and the PHY layer 243 (baseband). The RAN node (e.g., base unit 121) includes corresponding AS layers and may establish an AS signaling connection with the multi-USIM UE 205.

Note that the multi-USIM UE 205 (e.g., the ME 210 part of the multi-USIM UE 205), needs to implement at least as many NAS protocol stacks and radio protocol stacks (e.g., abbreviated as NAS/RP stack) as the number of USIMs which can be simultaneously registered with the same or different PLMN. In FIG. 2B, there are two NAS/RP stacks and 2 USIM cards/profiles. Note that each NAS/RP stack has its own receiver (e.g., a first receiver ("Rx-1") 247 for the USIM-1 207 and a second receiver ("Rx-2") 249 for the USIM-2 209), but the multi-USIM UE 205 has a single transmitter 245. Transmitted and received signals are communicated via the duplexer 251 and antenna 253.

Figure 3A:
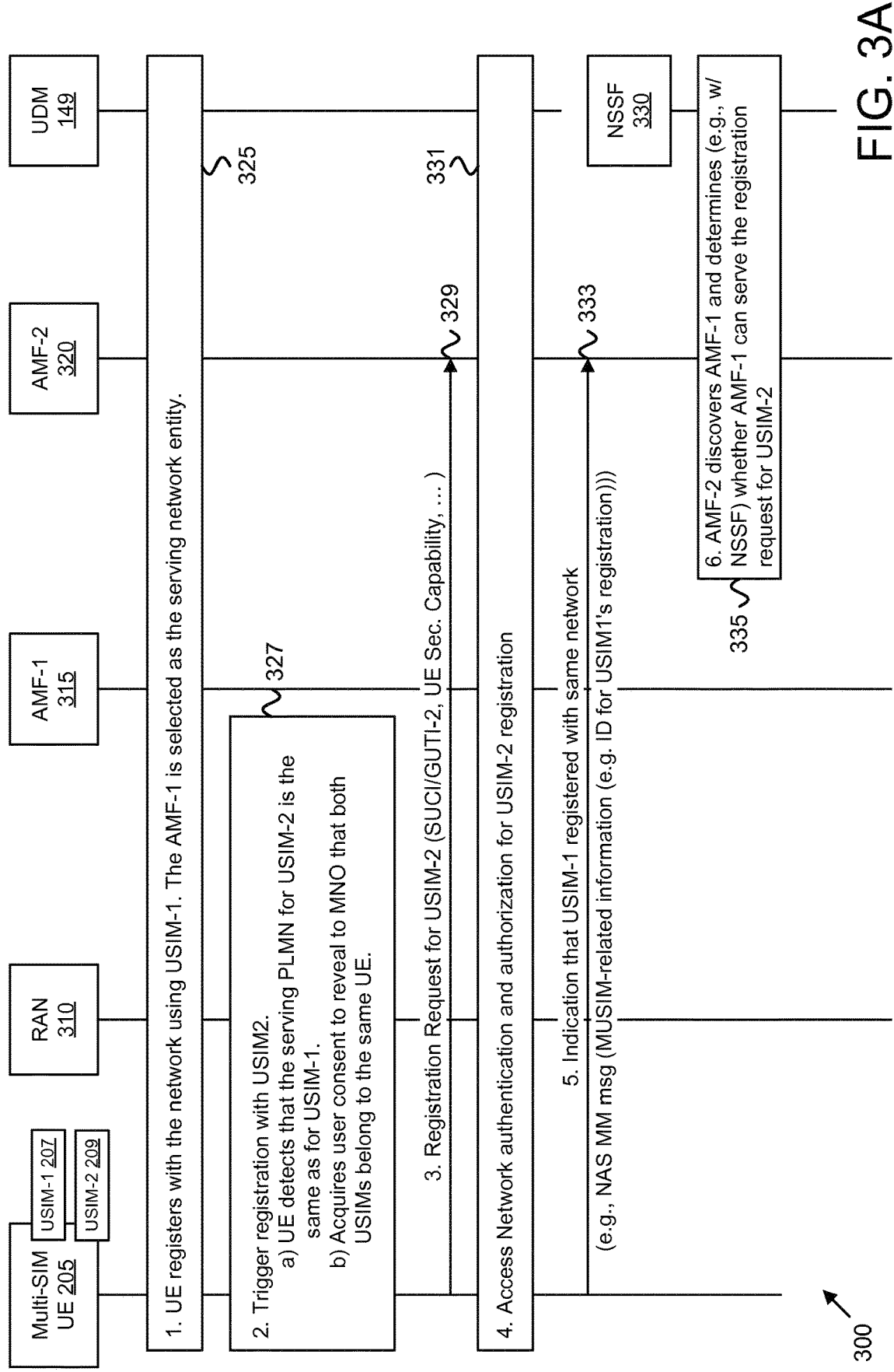
FIG. 3A is a signal flow diagram illustrating one embodiment of signaling flow for determining whether to perform AMF relocation during the registration procedure for a second SIM.
Figure 3B:
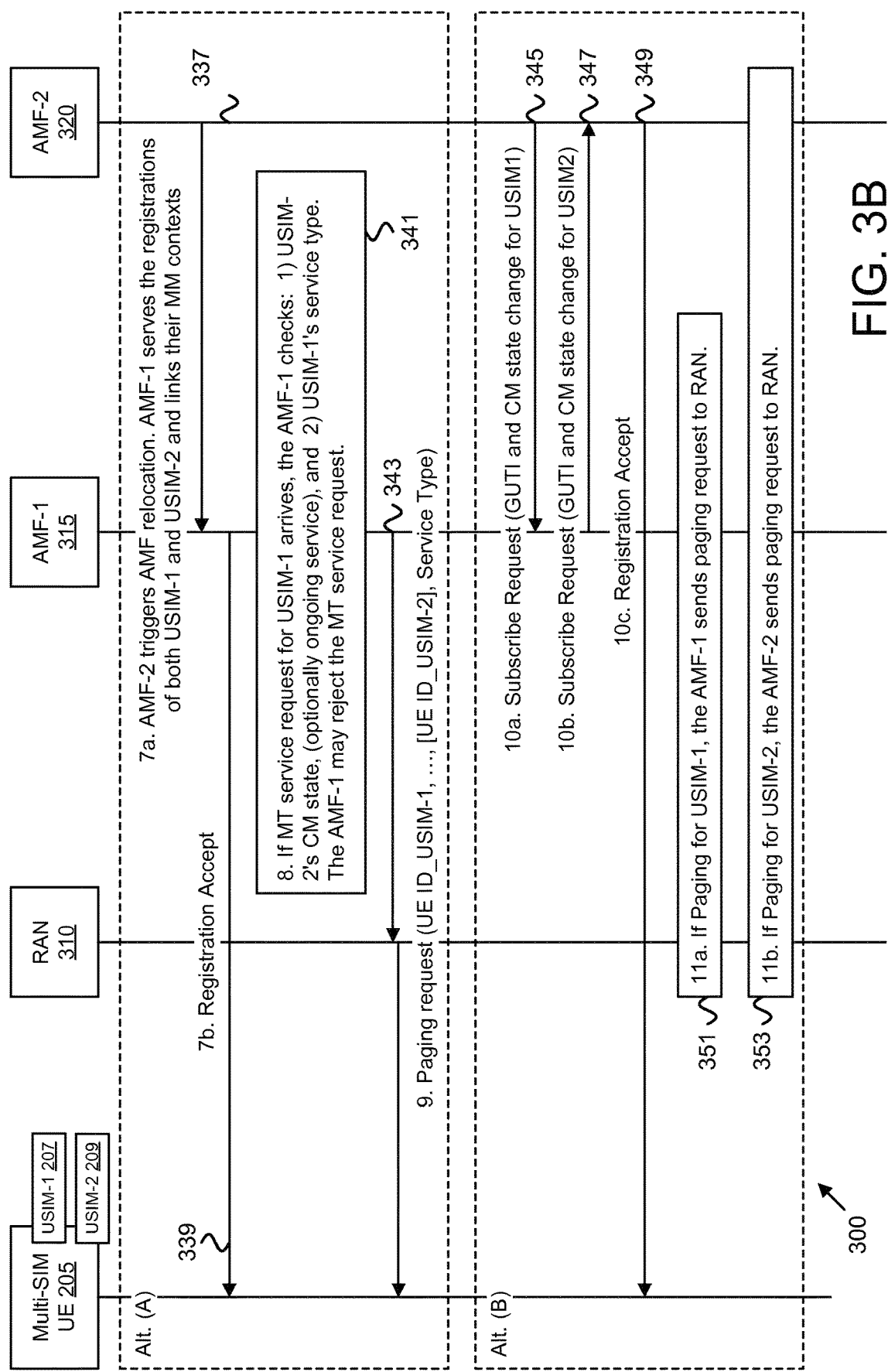
FIG. 3B is a continuation of the procedure depicted in FIG. 3A.

FIGS. 3A-3B depict a procedure 300 for determining whether to perform AMF relocation, according to embodiments of the disclosure. The procedure 300 involves the Multi-SIM UE 205 (containing USIM-1 207 and USIM-2 209), a RAN node 310, a first AMF ("AMF-1") 315, a second AMF ("AMF-2") 320, the UDM 149, and a network slice selection function ("NSSF") 330.

At FIG. 3A, the procedure 300 begins at step 1 as the UE 205 registers with the network (e.g., 5GS or EPS) using a first USIM (i.e., USIM-1 207, see messaging 325). Here, the AMF-1 315 is the serving network entity for USIM-1 207. For example, the UE 205 performs a Registration procedure to register with the 5GS.

At step 2, the UE 205 is triggered to perform a second registration with second USIM (i.e., USIM-2 209, see block 327). The UE 205, e.g., the ME part of the UE 205, detects that the selected serving PLMN for the registration with USIM-2 209 is the same PLMN which is used for the registration with USIM-1 207 (see block 327). For this determination, the NAS entity serving USIM-2 209 requests the NAS entity serving USIM-1 207 about the serving PLMN ID.

In certain embodiments, if the UE's NAS entity for USIM-2 209 determines that the USIM-1's serving PLMN ID is the same as the selected PLMN ID for USIM-2's registration, the ME may request the user consent whether to reveal to the network that both USIMs operate in the same UE 205 (see block 327). This may include a new implementation of the graphical user interface (GUI) to enable the user to select whether to disclose to the network that USIM-1 207 and USIM-2 209 operate in the same UE 205. In such embodiments, if the user consent is positive, then the UE 205 may provide new MUSIM-related information to the network (e.g., AMF or MME) as described further in step 5. However, if the user consent is negative, then the UE 205 does not provide MUSIM-related information to the network.

Please note that FIGS. 3A-3B show a non-roaming scenario where the USIM-1's and USIM-2's home PLMN is also a serving PLMN. However, the UE 205 may roam to a visited PLMN for the registration with at least one USIM. If the UE 205 is roaming and is registered to the same VPLMN for both USIMs, then the disclosed embodiments also apply. In other words, the UE 205 can detect either 1) that USIM-1 207 and USIM-2 209 belong to the same home PLMN based on the MCC+MNC from the corresponding SUPIs; or 2) that USIM-1's and USIM-2 209' registrations are with the same VPLMN in case of roaming, but MCC+MNC from the corresponding SUPIs are different.

At step 3, the UE 205 sends Registration Request for USIM-2 209 (e.g., including one or more informational elements like SUCI/GUTI2, etc.; see messaging 329).

At step 4, the network and the UE 205 perform access network authentication and authorization for USIM-2's registration (see block 331).

At step 5, after the NAS encryption is activated, the UE 205 provides to AMF-2 320 an additional MUSIM-related information to the network (see messaging 333). The MUSIM-related information may include an identifier for the registration context of the first USIM (e.g., MM context for USIM-1 207), e.g., a parameter 'GUTI for other registration'. Alternatively, and/or additionally, the MUSIM-related information may include an indication about the support (or capability) of MUSIM feature.

The UE 205 determines whether to include the additional identifier for USIM-1's registration based on the processing in step 2 (e.g., same PLMN for USIM-1 207 and USIM-2 209 and, optional, user consent to reveal this to the network). The 'GUTI for other registration' parameter is an indication to AMF-2 320 that the UE 205 is registered with another USIM in the same network. This indication can be sent in the SMC Complete message, or in a NAS mobility management (MM) message, e.g., in the same message wherein the UE 205 sends the UE 205 Radio Capability Update or UE 205 MM Core Network Capability to AMF-2 320. Optionally the indication 'additional GUTI for USIM-1 207' may be implemented as a new element of the UE 205 MM Core Network Capability IE.

In certain embodiments, the UE 205 may also send an explicit indication about support (or capability) of MUSIM feature. This explicit indication may be used by the serving MM function (e.g., AMF or MME) to determine whether to apply paging optimizations for MUSIM UE 205, e.g., whether to include service-related information ('service type' or paging cause) in the Paging message sent to the UE 205.

Please note that the MUSIM-related information (e.g. 'GUTI for other subscription' indication, MUSIM capability) may be sent in each periodic and/or mobility registration update procedure. Alternatively, and/or additionally, the MUSIM-related information (e.g. parameter 'GUTI for other subscription') may be stored in the MM context in the AMF and sent to a target AMF upon mobility procedure.

Alternatively, the MUSIM-related information may be sent during step 3 in case there is a NAS security context available. However, if during step 3, the NAS Registration Request message is to be sent in cleartext (i.e., not encrypted), then the UE 205 may wait until the NAS encryption is established before sending the GUTI for other subscription' information.

At step 6, the AMF-2 320 attempts to discover AMF-1 315 based on the GUAMI part of the 'GUTI for other subscription' (see block 335). Once the AMF-2 320 verifies that the AMF-1 315 is existing and reachable, the AMF-2 320 determines whether AMF-1 315 can serve USIM-2's registration request.

In one possible embodiment, the AMF-2 320 is able to 1) discover the AMF-1 315 and 2) determine whether AMF-1 315 can serve the UE's registration for USIM-2 209 based on the internal configuration in the AMF-2 320. For example, the AMF-2 320 may have a configuration data about the neighboring AMFs and which network slices (e.g., S-NSSAIs) the AMFs are able to serve.

In another embodiment, the AMF-2 320 may request from NSSF 330 to determine the Allowed NSSAI in this area. Additionally, the AMF-2 320 may indicate the AMF-1 315 ID (AMF's GUAMI) in the request to NSSF 330 in order to let the NSSF 330 determine whether AMF-1 315 can serve the USIM-2's requested NSSAI. For example, the Nnssf_NSSelection_Get service operation may be enhanced to include a 'suggested AMF ID' (e.g., AMF-1 315 ID). The NSSF 330 returns to the AMF-2 320: 1) the allowed NSSAI (including a list of S-NSSAIs), and 2) an indication whether AMF-1 315 can or cannot serve the USIM-2's registration. The NSSF 330 can use Nnssf_NSSelection_Get response service operation to send the information back to the AMF-2 320.

Depending on whether the first AMF is able to serve the second registration, the procedure 300 advances to either Solution (A) or Solution (B). Solution (A) is applicable the first AMF is able to serve the USIM-2's registration and includes a mechanism for association of the MM contexts within the same AMF.

Referring to step 7, because in step 6 the AMF-2 320 determined that AMF-1 315 can serve the USIM-2's registration, the AMF-2 320 initiates AMF relocation procedure towards the AMF-1 315 (see messaging 337). For example, the AMF relocation procedure is described in 3GPP TS 23.501 clause 4.2.2.2.3 "Registration with AMF re-allocation". The AMF-2 320 may include an additional indication in the signaling to AMF-1 315 that this NAS Registration request message is for a registration associated with USIM-1 207. For example, the AMF-2 320 can forward the USIM-1's GUTI are received from the UE 205 (e.g., in step 3 or step 5).

The AMF-1 315 completes the registration procedure for USIM-2 209 (see messaging 339). As a result, the AMF-1 315 serves both the USIM-1 207 registration and the USIM-2 209 registration. Additionally, the AMF-1 315 internally links the associated MM contexts (i.e., the USIM-1 207 MM context and USIM-2 209 MM context). For example, the AMF-1 may store the identifier (GUTI, TMSI, or S-TMSI) of the UE using USIM-1 in the USIM-2 209 MM context and store identifier (GUTI, TMSI, or S-TMSI) of the UE using USIM-2 in the USIM-1 207 MM context. This linking means that for certain procedures, e.g., network-initiated Service Request procedure, the AMF-1 315 should internally check the CM state and/or ongoing services for the linked MM context.

The AMF-1 315 may create a new MM context parameter (or parameter structure) which is used for storing the information about the associated registration for the UE using the other USIM. For example, this new parameter can be called "associated USIM registration information." This new "associated USIM registration information" may contain at least one of: 1) the identifier for the registration of the other USIM (e.g., 'GUTI/TMSI for other registration'—this parameter may be created upon the reception of the Registration request message and the parameter can be updated from another AMF maintaining the associated registration for the other USIM); 2) the CM state of associated registration (i.e., registration for other USIM); and 3) activated services of associated registration can be inquired on demand internally in the AMF-1 315 when the AMF needs to page the UE 205 for USIM-1 207. The AMF may determine the activated services based on the DNN type used for the activated PDU Sessions or based on specific indication (e.g. 'emergency' indication) during the establishment of the PDU Session or connection.

This MM context parameter "associated USIM registration information" may be applicable to the MM context for all other solutions described in this document (e.g., solutions B, C, D and E). This new MM context parameter is also applicable for the MM context of the UE 205 using USIM-2 209.

At step 8, if the AMF-1 315 needs to initiate Paging for USIM-1 207 (e.g., due to MT communication; see block 341), the AMF-1 315 performs at least the following checks with the USIM-2's MM context: a) USIM-2's CM state and, if the state is CM-Connected, b) the service type of the activated services. The AMF-1 315 determines whether to send the paging request based on the paging decision criteria of the fifth aspect.

The AMF-1 315 uses all the information available for the MT service, e.g., received from SMF or SMSF or GMLS other network function initiating the MT service, in order to determine the paging strategy. In case of user plane data delivery, the AMF-1 315 determines the service type (or paging cause) for the MT service based on the Paging Policy Indicator (PPI) and, optionally, a paging cause value sent from the SMF. On the other hand, the SMF can determine the PPI and the service type (or paging cause value) if Paging Policy Differentiation (PPD) mechanism applies and the SMF uses the DSCP value (from the TOS field of the IP packet header) or other traffic information received from the UPF. In case of MT control plane signaling/traffic (e.g., MT SMS), the AMF determines the paging strategy and Paging Cause based on the type of MT control plane traffic.

If the AMF-1 315 decides to not page the UE 205, the AMF-1 315 may change the USIM-1 207 registration state to temporarily unreachable. The AMF-1 315 may store the MT service request (depending on the MT service type) and/or inform the NF which initiated the MT service request. The AMF-1 315 may subscribe to receive notification (i.e., internally check) when the USIM-2's CM/EMM state changes to Idle. Then the AMF-1 315 can decide whether to send the paging.

At step 9, if the AMF-1 315 decides to initiate paging for the USIM-1 207 registration, then the AMF-1 315 sends a Paging request including at least one of the UE identifier (e.g., UE ID for USIM-1's registration, called e.g. "UE ID_USIM-1"), Service Type (or paging cause determined based on the MT service), indication that the UE 205 may be active for registration to a second USIM, UE Identifier of the UE 205 using the USIM-2 209 (called e.g. "UE ID_USIM-2") and other elements (see messaging 343).

The additional parameters/information may be included in the paging request message if the AMF/MME is aware that the UE 205 is a MUSIM UE 205. If the AMF does not store MUSIM-related information (e.g. MUSIM capability, identifier of associated registration for other USIM), then the AMF does not include the additional parameters in the paging request message. The additional/new parameters are explained as follows:

The 'service type' (or paging cause) of the MT service is may be used in the UE 205 to determine whether to suspend a connection of the UE 205 towards services for a second USIM.

The indication that the UE 205 may be active (e.g., CM-Connected state) for a registration to a second USIM is derived in the AMF using the MM context information of the second USIM. This parameter can be called e.g., 'state of other registration' meaning that the CM state or RRC state of connection for the registration with the second USIM. The RAN can use this indication to derive paging strategy and/or alternative paging occasions calculation mechanism for transmitting the paging message to the UE 205.

The UE Identifier of the UE 205 using the USIM-2 209 (called e.g. "UE ID_USIM-2" and put in square brackets to show that it can be conditionally included in the paging request) can be sent to the RAN if the second MM context (for the UE 205 using the USIM-2 209) is in CM-Connected state or RRC-Inactive state. If the second MM context is CM-Idle, then this parameter may not be sent to the RAN. This parameter can help the RAN to identify the UE 205 context of the UE 205 using USIM-2 209 and, whenever needed the RAN can configure service gaps in the radio transmission for the UE 205 using USIM-2 209 in order to allow the UE 205 to listen to the paging occasions for the UE 205 using the USIM-1 207. Thus, even a single Rx capable UE 205 would be able to listen to the Paging message while the UE 205 in in CM/RRC Connected or RRC Inactive state for the USIM-2's services.

Solution (B) is applicable where the first AMF is not able to serve the USIM-2's registration. Solution (B) includes a mechanism for association of the MM contexts between different AMFs.

At step 10, because in step 6 the AMF-2 320 determines that AMF-1 315 cannot serve the USIM-2's registration, the AMF-2 320 remains the AM/MM serving node for USIM-2 209. The AMF-2 320 completes the registration procedure and sends the Registration accept message to the UE 205. The AMF-2 320 sends a request to AMF-1 315 to subscribe to notifications upon change of the identifier (e.g. GUTI, TMSI) of the UE using USIM-1 (see messaging 345). This is also used as indication in AMF-1 315 that the UE 205 is registered with multiple USIMs (preferably but not limited to) with the same serving PLMN. Correspondingly, the AMF-1 315 (after successfully processing the AMF-2 320 request) also subscribes with AMF-2 320 to be notified upon USIM-2's GUTI change (see messaging 347). The AMF-2 320 completes the registration procedure for USIM-2 209 (see messaging 349).

The signaling exchange between AMF-1 315 and AMF-2 320 for change of the GUTI for UE using USIM can use an existing service operation or a new service operation can be specified. For example in step 10*a*, the AMF-2 320 may use the service operation Namf_EventExposure_Subscribe request (event type, USIM-1's GUTI, USIM-2's GUTI) where the 'event type' may mean "GUTI change" for USIM-1's GUTI wherein the USIM-2's GUTI is the identifier in AMF-2 320. Analogically, in step 10*b*, the AMF-1 315 may perform Namf_EventExposure_Subscribe request (event type, USIM'2 GUTI, USIM-2's GUTI).

As result, each AMF (i.e., AMF-1 315 and AMF-2 320) creates a new MM context parameter (or parameter structure) which is used for storing the information about the associated registration for the other USIM. For example, this new parameter can be called "associated USIM registration information," as already described in step 7.

In various embodiments, the "associated USIM registration information" may contain at least one of the following parameters: 1) an identifier for the registration of the other USIM (e.g., 'GUTI/TMSI for other registration'). This parameter may be created upon the reception of the Registration request message; and the parameter can be updated from another AMF maintaining the associated registration for the other USIM; 2) the CM state of associated registration (i.e., registration for other USIM. Note that this parameter is included if the AMF receives the Notification from the other AMF about the CM state being Connected of the UE's registration for the second USIM); and 3) Activated services of associated registration (note that this is created the AMF receives the Notification from the other AMF).

At step 11, if a MT communication request a) for USIM-1 207 arrives at AMF-1 315 or b) for USIM-2 209 arrives at AMF-2 320, the AMF-1 315 or AMF-2 320 determines whether to send a paging request to RAN node 310 (see blocks 351-353). Here, consideration of the CM state and service priorities may be taken when determining whether to send the paging request to the RAN node 310. Please note that further details about the functionality in case of case (B) including steps 10 and 11 is provided below with reference to FIGS. 4A-4B.

Note that if a de-registration procedure is performed for one USIM (e.g., for USIM-1 207), then the network should be updated to release/delete the associations between the MM contexts of USIM-1 207 and USIM-2 209, i.e., the association within the same AMF or between the different AMFs should be released. For example, one of the following solutions can be applied:

In a UE 205—based solution, the NAS layer of USIM-1 207 informs the USIM-2's NAS layer about the deregistration. The USIM-2's NAS layer may perform a registration procedure to update the network (e.g., AMF-2 320 or MME2) that the associated USIM-1's registration is not anymore available. For example, the USIM-2's NAS layer sends a Registration Request message without including the 'GUTI for other subscription' indication.

In a network-based solution, if e.g., USIM-1's state in the network (e.g., AMF-1 315 or MME1) changes to RRM-Deregistered, the AMF-1 315 can send a Notification to the AMF-2 320 to delete the association for the USIM-1's GUTI.

Figure 4A:
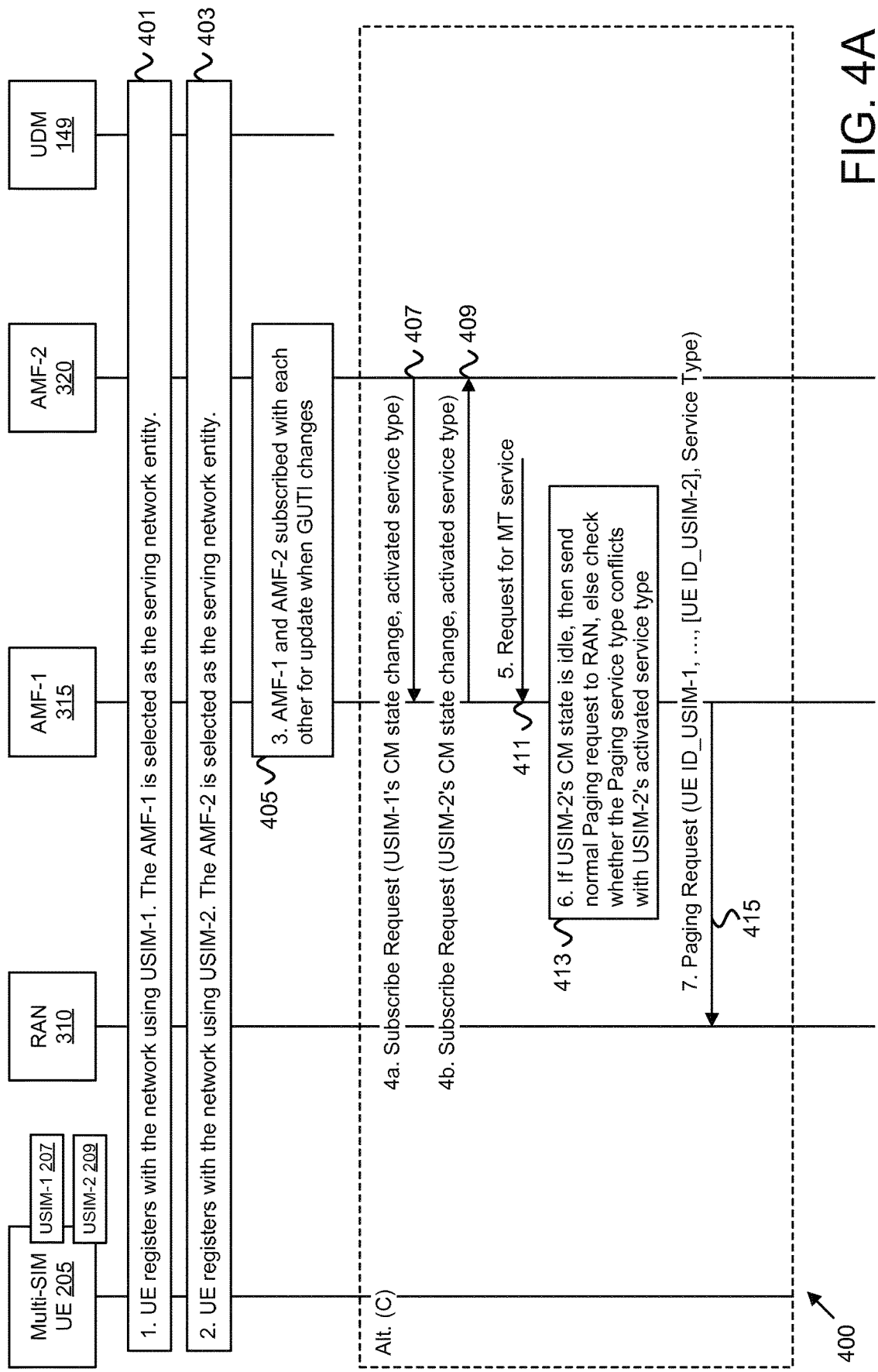
FIG. 4A is a signal flow diagram illustrating one embodiment of signaling flow for MT services in case of different AMFs serving the SIM1 and SIM2 registrations.
Figure 4B:
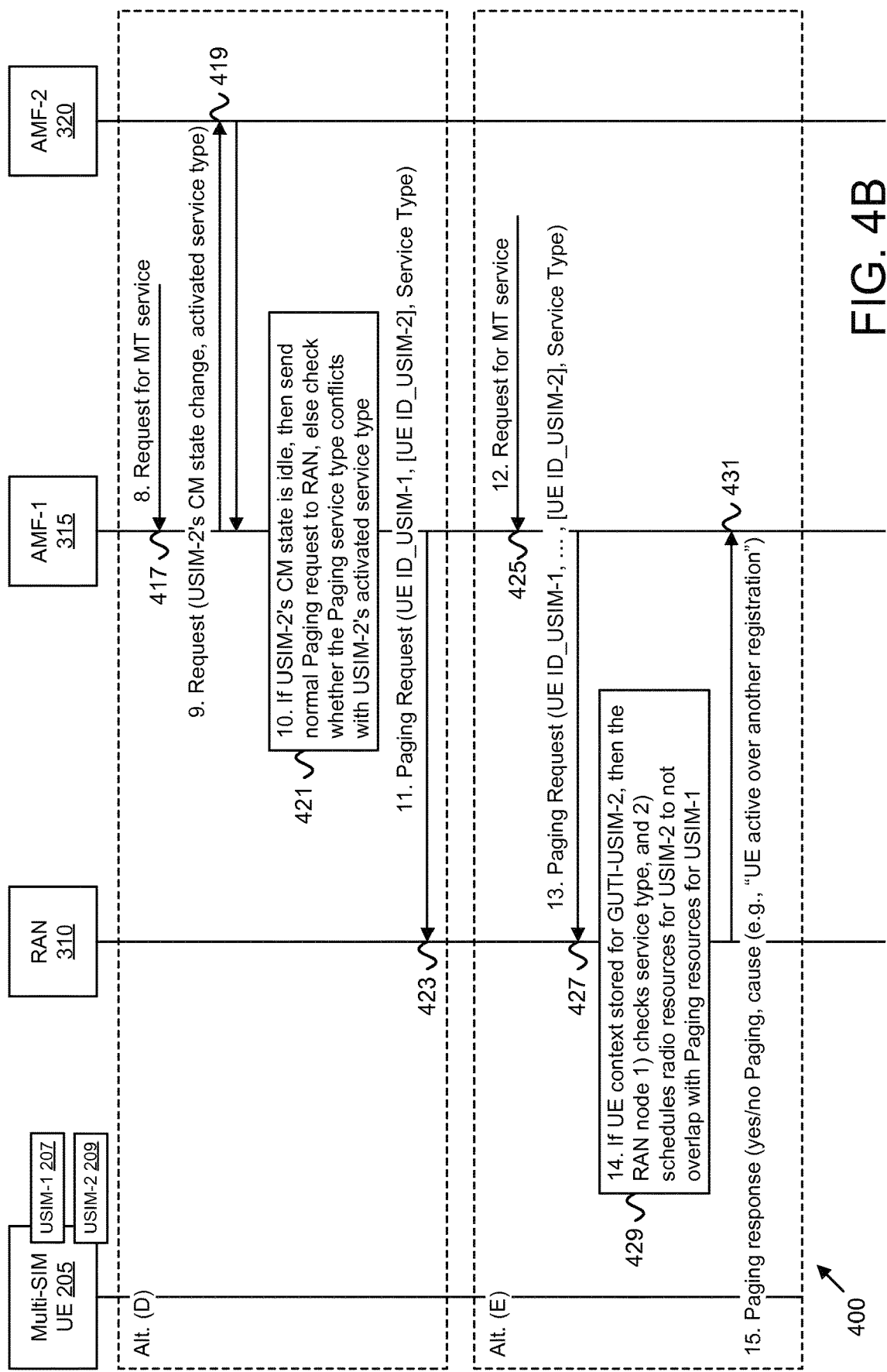
FIG. 4B is a continuation of the procedure depicted in FIG. 4A.

FIGS. 4A-4B depict a procedure 400 for MT services in case of different AMFs serving the USIM1 and USIM2 registrations, according to embodiments of the disclosure. The procedure 400 involves the multi-SIM UE 205, the RAN-1 node 310, the AMF-1 315, the AMF-2 320, and the UDM 149.

At FIG. 4A, the procedure 400 begins at step 1 as the UE 205 registers with the network (e.g., 5GS or EPS) using a first USIM (i.e., USIM-1 207, see messaging 401). Here, the AMF-1 315 is serving network entity for the USIM-1's registration. As depicted, the UE 205 may perform a Registration procedure to register with the 5GS.

At step 2, the UE 205 is triggered to perform a second registration with second USIM (i.e., USIM-2 209, see messaging 403). The UE 205 performs registration for USIM-2 209 as described in steps 2-6 of FIG. 3A.

Returning to FIG. 4A, at step 3 the AMF-2 320 is the AM/MM serving node for the USIM-2 209 registration. The AMF-2 320 sends a request to AMF-1 315 to subscribe to notifications upon change of USIM-1's GUTI (see block 405). This is also used as indication in AMF-1 315 that the UE 205 is registered with multiple USIMs with the same serving PLMN. Correspondingly, the AMF-1 315 (after successfully processing the AMF-2 320 request) also subscribes with AMF-2 320 to be notified upon USIM-2's GUTI change (see block 405).

For example, the AMF-2 320 may use the service operation Namf_EventExposure_Subscribe request (event type, USIM-1's GUTI, USIM-2's GUTI) where the 'event type' may mean "GUTI change" for USIM'1 GUTI wherein the USIM-2's GUTI is the identifier in AMF-2 320.

Solution (C), Solution (D), and Solution (E) depict alternative solutions for paging the UE 205 when the USIM-1 207 and USIM-2 209 are served by different AMFs.

Solution (C) depicts signaling flow for subscribing 'in advance' for USIM CM status. At step 4a, the AMF-2 320 sends a request to AMF-1 315 to subscribe to notifications upon change of USIM-1's GUTI (see messaging 407). This is also used as indication in AMF-1 315 that the UE 205 is registered with multiple USIMs with the same serving PLMN. In solution (C), the subscription for notification is for 1) the CM state of the USIM and 2) the currently activated services if the state is CM-Connected. At step 4b, the AMF-1 315 sends a request to AMF-2 320 to subscribe to notifications upon change of USIM-2's GUTI (see messaging 409). Again, the subscription for notification is for 1) the CM state of the USIM and 2) the currently activated services if the state is CM-Connected. Note that steps 4a-4b of FIG. 4A are similar to steps 10a and 10b of FIG. 3B.

At step 5, the USIM-1's MM state is CM-Idle and AMF-1 315 receives a request for MT service, i.e., AMF-1 315 may perform a network initiated service request or paging procedure (see messaging 411).

At step 6, the AMF-1 315 determines based on the updates from AMF-2 320 whether to perform paging procedure, e.g., based on the paging decision criteria of the fifth aspect, above (see block 413). Note that step 5 of FIG. 4A is similar to step 8 in FIG. 3B. For example, AMF-1 315 uses the information about 1) if the CM state of the UE using USIM-2 is Idle, send normal paging request; 2) if the CM state of the UE using USIM-2' is Connected, check whether the MT service type doesn't conflict with the services activated for the UE using USIM-1.

At step 7, the AMF-1 315 sends paging request message to the RAN node 310 (see messaging 415). This step is similar to step 9 in FIG. 3B. The paging request message may include at least one of: the UE identifier of the UE 205 using USIM-1 207 (called e.g. "UE ID_USIM-1"), the service type of the MT service, and/or the UE identifier of the UE 205 using USIM-2 209 (called e.g. "UE ID_USIM-2").

The AMF-1 315 may include the UE identifier of the UE 205 using USIM-2 209 (e.g., UE 205-ID_USIM-2 209) if the UE 205 using USIM-2 209 is in CM-Connected state or RRC-Inactive state. The UE 205-ID_USIM-2 209 would allow the RAN create service gap in the radio transmissions for the UE 205 using USIM-2 209 in such a way that the UE 205 using USIM-1 207 is able to listen to the paging occasions for the paging message.

One drawback of solution (C) is that the AMFs needs to update each other in step 4 each time when the CM state changes. This may result in higher network signaling. One advantage of solution (C) is that the delay for downlink data delivery (i.e., paging procedure) is minimized.

Continuing at FIG. 4B, Solution (D) depicts signaling flow for 'on demand' checking of the CM/EMM status for an associated USIM. At step 8, the USIM-1's MM state is CM-Idle and AMF-1 315 receives a request for MT service (see messaging 417).

At step 9, the AMF-1 315 sends to AMF-2 320 a request for state information (USIM-1's GUTI, USIM-2's GUTI, CM state, activated services type). This may be an existing or a new service request. For example, a new service request Namf_MT_ProvideStateInfo can be defined. The request may contain at least the following parameters (or IEs): the identifier of the MM context in the AMF-1 315 (e.g., USIM-1's GUTI), an identifier of the MM context in the AMF-2 320 (e.g., USIM-2's GUTI), the current CM state of the target MM context (e.g., IE can be called 'CM state'), or the activated current services of the target MM context (e.g., IE can be called 'activated services type').

The AMF-2 320 replies and provides the requested information to AMF-1 315 (see messaging 419). For example, the AMF-2 320 may provide the following parameters (or IEs): the identifier of the MM context in the AMF-1 315 (e.g., USIM-1's GUTI), an identifier of the MM context in the AMF-2 320 (e.g., USIM-2's GUTI), the current CM state of the target MM context (e.g., 'CM state=Idle/Connected'), or the activated current services of the target MM context (e.g., 'activated services type=[default data]/[IMS voice]/MPS/emergency/MCS').

At step 10, the AMF-1 315 determines based on the updates from AMF-2 320 whether to perform paging procedure, e.g., based on the paging decision criteria of the fifth aspect, above (see block 421). This is similar to Step 6 of FIG. 4A and to step 9 in FIG. 3B, described above. At step 11, the AMF-1 315 sends paging request message to the RAN node 310 (see messaging 423). This is similar to Step 7 of FIG. 4A, described above.

One Advantage of solution (D) is that the AMFs needs to request the CM state of the associated MM context in step 9 only if paging procedure is to be performed. This results in less network signaling compared to solution (C). One drawback of solution (D) is that the delay for downlink data delivery (i.e., paging procedure) is slightly increased by the time required to perform step 9.

Solution (E) depicts signaling flow for paging decision at the RAN node 310. In solution (E), the RAN node 310 may manage the radio resources for the active communication for one USIM in order to allow the paging to be delivered for the other USIM.

At step 12, the USIM-1's MM state is CM-Idle and AMF-1 315 receives a request for MT service (see messaging 425). At step 13, the AMF-1 315 sends a paging request message to RAN (i.e., UE-ID, . . . , associated RAN context ID, Service Type). The paging message contains at least or more of the following parameters (IEs): the temporary identifier of the paged UE 205 (e.g., UE 205-ID or USIM-1's GUTI or S-TMSI), the temporary identifier of the associated RAN context for other USIM registration (e.g., USIM-2's GUTI) and/or the service type of the MT service (see messaging 427). At least the temporary identifier of the associated RAN context for other USIM registration (e.g., USIM-2's GUTI or S-TMSI) is a new parameter used in the RAN node 310 as pointer to possible existing UE 205 context in the RAN node 310 (or other neighbor RAN nodes).

At step 14, the RAN node 310 (e.g., gNB or eNB or other base station) determines whether there is UE 205 context identified by identifier of the UE 205 context for USIM-2 209' (e.g., based on USIM-2's GUTI or USIM-2's 5G-S-TMSI). The RAN node 310 may apply logic which is similar to the AMF logic to determine whether to page, using the paging decision criteria of the fifth aspect (see block 429).

For example, if there is UE 205 context in the RAN node 310 identified by the USIM-2's GUTI, the RAN node 310 checks the service type of the activated data radio bearers (DRBs) for USIM-2's GUTI. If the USIM-2's GUTI services are priority services (e.g., emergency, or MPS) the RAN node may determine to not transmit the paging for USIM-1's GUTI. Alternatively, if the paging message for USIM-1's GUTI is a paging for a priority service and the USIM-2's GUTI service is normal or low priority, the RAN node 310 may decide to transmit the paging for the USIM-1's GUTI (i.e., for the 5G-S-TMSI derived from the USIM-1's GUTI).

Please note that the AMF sends the paging request message to multiple RAN nodes in the UE's registration area, i.e., the mobility registration is specific to the UE 205 using USIM-1 207. If the UE 205 using USIM-1 207 and the UE 205 using USIM-2 209 are served by the same core network (e.g., EPC or 5GC), the paging request message would arrive at the RAN node 310 which also servers the UE 205 using USIM-2 209. Thus, it is quite probable that the same RAN node 1) would send the paging request to the UE 205 using USIM-1 207 and 2) serves the current connection of the UE 205 using USIM-2 209.

If the RAN node 310 determines to transmit the paging for the USIM-1's GUTI, the RAN node 310 may determine to schedule the radio resources for USIM-2 209 downlink or uplink transmissions in such a way that the transmissions for USIM-2 209 do not overlap with the paging resources for transmission of the paging message to the UE 205 using USIM-1 207. The RAN node 310 may also consider 1) the UE 205 radio capabilities, which are stored in the UE 205 context for the UE 205 using USIM-2 209, to determine how many reception chains (e.g., Rx capabilities) the UE 205 implements, or 2) the type of connection between the UE 205 using the USIM-2 209 and RAN (e.g., whether dual-connectivity or carrier aggregation are used).

Based on the UE 205 radio capabilities and current radio connection to UE 205 using USIM-2 209, the RAN node 310 can decide whether to modify and how to modify the current radio connection to UE 205 using USIM-2 209 in order to free-up resources to allow the UE 205 using USIM-1 207 to monitor the paging resources.

For example, the RAN node 310 may create service gaps in the scheduling for the UE 205 using USIM-2 209 services. The RAN node 310 may indicate via RRC procedure to the UE 205 (i.e., USIM-2's radio protocols) that the service gap is introduced in order to allow to the UE 205 (i.e., USIM-1's radio protocols) to receive the paging transmission for USIM-1 207. The RAN node 310 schedules and transmits the paging message according to formula for paging resource occasion calculation. The paging resource (paging occasion and paging frame) are derived based on the UE ID (IMSI or 5G-S-TMSI or as used in this document, USIM's GUTI, whereas operations like "modulo 1024" can be applied to the UE ID), the paging cycle (T) and the number (N) of total paging frames in T.

If dual connectivity (DC) is used for the active connection to the UE 205 using USIM-2 209, both radio reception chains (i.e., for dual Rx capable UE 205) may be involved in the communication for the UE 205 using USIM-2 209. Thus, the RAN node 310 may need to reconfigure the radio connection to the UE 205 using USIM-2 209 in such a way that the radio reception chain (e.g., Rx) is able to receive the Paging over Uu interface for the UE 205 using USIM-1 207.

Furthermore, if the RAN node 310 does not find internally a RAN UE context matching the other USIM GUTI, the RAN node 310 may request neighbor RAN nodes. This is especially applicable if the USIM-1 207 connection is established over LTE access (having eNB as RAN node 310) and the USIM-2 209 connection over NR access (having gNB as RAN node 310). The UE's context ID in both cases should be derivable from the GUTI (or S-TMSI).

At step 15, the RAN node 310 sends to the AMF a paging response message including at least one of the following parameters (IEs): a result of the paging transmission over Uu interface (e.g., 'Paging=yes/no'), a cause value indicating why the paging was not transmitted over the Uu interface (e.g., 'due to unavailable radio resources' or 'due to higher priority services for other UE 205 connection', etc.) (see messaging 431).

One advantage of solution (E) is that the core network signaling for coordination between AMFs is reduced. Please note that the solution (E) assumes that the UE 205 (or ME) camps under the same RAN node 310 for both USIM-1 207 and USIM-2 209. This assumption is realistic, as the same shared ME is used by both USIMs.

If USIM-1's registration and USIM-2's registration are served by different AMFs, the solution of solution (E) in FIG. 4B can be applied. The benefit of solution (E) is that the paging decision can be performed at the common RAN node 310 and the signaling between the AMFs in the core network can be avoided and no additional delay is introduced. If the USIM-1's registration and USIM-2's registration served by the same AMF, the solution (A) in FIG. 3B can be applied. The benefit of solution (A) is that the decision for paging is performed in the AMF internally and the signaling for paging towards the RAN can be avoided.

If the MUSIM UE 205 is registered with one USIM (e.g., USIM-1 207) via LTE/EPC network (i.e., the serving node is an MME) and the registration for the other USIM (e.g., USIM-2 209) is via NR/5GC network (i.e., the serving node is an AMF) in the same PLMN, then the association between the AMF in 5GC and MME in EPC needs to be established. This can be performed as described e.g., in step 3 in FIG. 4A. An existing signaling message or a new signaling message over the N26 interface can be used used. New parameters in the signaling exchange between MME and AMF should be used as shown in step 3 and step 9 in FIGS. 4A-4B.

In a different embodiment, the UE 205 is generating a globally unique Multi SIM Capability Identifier (MSCI) based on the device IDs and/or the subscription IDs of/from the different USIMs. After NAS security is setup, the UE 205 includes the MSCI in the complete registration request to the AMF in the serving network and the AMF informs the UDM 149/UDR about the MSCI for this specific SUPI. In case the UDM 149/UDR receives different messages with the same MSCI for a different SUPI, it binds the two registration together and informs the involved AMFs about each other. The AMFs may perform a relocation incase the requested NSSAIs are matching.

In a variation, the AMF queries a local database in the serving network whether other registrations with the same MSCI are performed in order to provide multi SIM optimizations in case the USIMS belong to different MNOs but in case of roaming, the same roaming partner is selected for both USIMs.

All described solutions (A), (C), (D), (E) feature the benefit of avoiding the signaling for paging over the radio interface if the MUSIM UE is engaged in communication for the other USIM and certain criteria (e.g., the paging decision criteria of the fifth aspect). One criterion to decide whether to page the UE is based on comparing the service types of the MT communication service for one USIM and of the ongoing services for the other USIM.

While the procedures of FIGS. 3A-3B and 4A-4B are described with the assumption of UEs operating in MUSA mode, note that the solutions can be also applied for UEs operating in MUMA mode.

Figure 5:
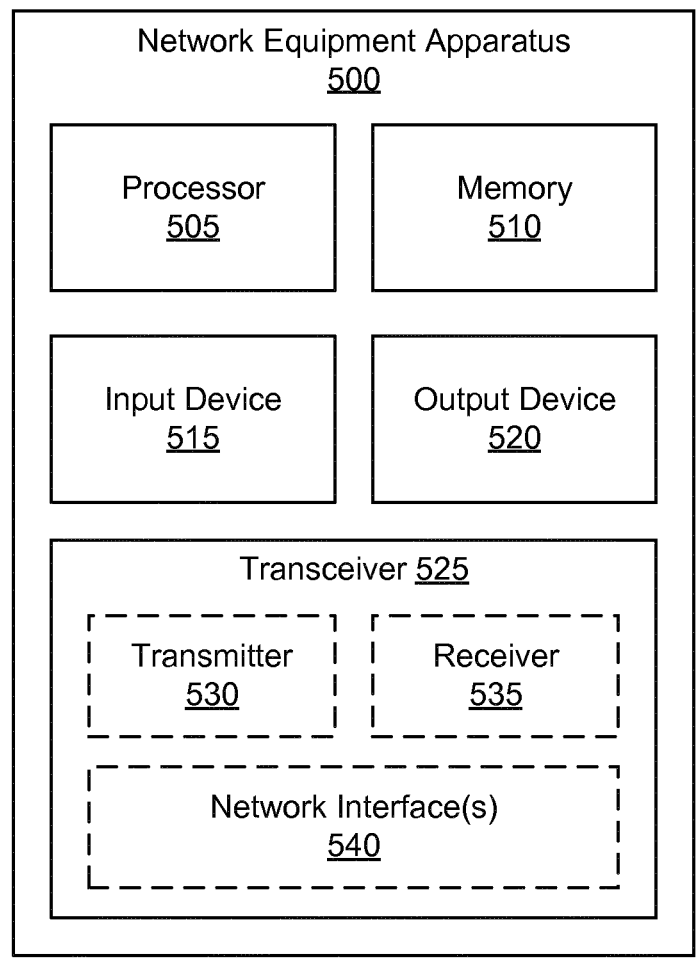
FIG. 5 is a block diagram illustrating one embodiment of a network equipment apparatus for paging multi-SIM devices in the same network.

FIG. 5 depicts one embodiment of a network equipment apparatus 500 that may be used for paging multi-SIM devices in the same network, according to embodiments of the disclosure. In some embodiments, the network equipment apparatus 500 may be one embodiment of a RAN node, such as the base unit 121 and/or the RAN-1 node 310. In other embodiments, the network equipment apparatus 500 may be one embodiment of the AMF 143, the AMF-1 315, the AMDF-2 320, and/or an MME. Furthermore, network equipment apparatus 500 may include a processor 505, a memory 510, an input device 515, an output device 520, a transceiver 525. In some embodiments, the input device 515 and the output device 520 are combined into a single device, such as a touch screen. In certain embodiments, the network equipment apparatus 500 does not include any input device 515 and/or output device 520.

As depicted, the transceiver 525 includes at least one transmitter 530 and at least one receiver 535. Here, the transceiver 525 communicates with one or more remote units 105 and with one or more interworking functions 135 that provide access to one or more PLMNs Additionally, the transceiver 525 may support at least one network interface 540. In some embodiments, the transceiver 525 supports a first interface (e.g., an N2 interface) that communicates with RAN node, for example a gNB or eNB, a second interface (e.g., an N8, N11, N15, etc. interfaces) which communicates with one or more control-plane network functions (e.g., UDM, SMF, PCF) in a mobile core network (e.g., a 5GC) and a third interface (e.g., N1 interface) that communicates with a remote unit (e.g., UE) over the first interface (N2 interface) via a 3GPP access network or via a non-3GPP access network.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the first transceiver 525.

In various embodiments, the network equipment apparatus acts as an AMF serving one SIM of a multi-SIM UE, where a different AMF in the same mobile communication network (e.g., same PLMN or MNO) is serving the other SIM of the multi-SIM UE. In such embodiments, the transceiver 525 may receive a registration request initiating a first registration to register a UE with a mobile communication network using a first SIM in the UE. Here, the processor 505 determines that the UE is registered with the mobile communication network via a second registration using a second SIM in the UE and identifies a MM function serving the second registration. The processor 505 determines whether the MM function is able to serve the first registration and initiates a relocation to transfer the first registration to the MM function in response to determining that the MM function is able to serve the first registration. Otherwise, the processor 505 updates a MM context in the MM function corresponding to the second registration to contain an identifier of first registration, in response to determining that the MM function is unable to serve the first registration.

In some embodiments, the processor 505 stores an identifier of the second registration in an MM context corresponding to the first registration. In certain embodiments, the processor 505 determines that the UE using the first SIM should be paged after updating the MM context in the MM function. In such embodiments, the processor 505 identifies a CM state of the MM context in the MM function, the CM state being one of a connected state and an idle state and determines whether to send a paging message towards the UE based on the CM state of the UE with respect to the second SIM.

In certain embodiments, the processor 505 sends the paging message to an access network node serving the UE in response to the CM state being identified as an idle state. In other embodiments, the CM state is identified as a connected state. Here, determining whether to send a paging message towards the UE may include identifying an activated service of the UE using the second SIM. In such embodiments, the processor 505 determines not to send the paging message in response to a priority of the activated service having a higher priority than a service triggering the paging request. Additionally, the processor 505 may determine to send the paging message to an access network node serving the UE using the first SIM in response to priority of the activated service not having a higher priority than the service triggering the paging request. Here, the paging message includes an identifier of the second registration.

In certain embodiments, the processor 505 updates an MM context corresponding to the first registration to a temporarily unreachable state in response to determining not to send the paging message. Moreover, the processor 505 may revert the MM context corresponding to the first registration to a reachable state in response to receiving an indication from the MM function that the CM state is an idle state. In certain embodiments, identifying the CM state includes requesting state information for the second SIM from the MM function in response to receiving the paging request, wherein the state information for the second SIM includes the CM state and an activated service of the UE associated with the second SIM.

In some embodiments, the processor 505 further subscribes to receive notifications upon change of a CM state. In further embodiments, the processor 505 may subscribe to receive notifications upon change of a temporary identifier assigned to the second SIM in response to the MM function being unable to serve the registration request. In some embodiments, the registration request includes a second temporary identifier identifying the second registration of the UE using the second SIM in a MM function; and wherein the identification of the MM function is contained in the second temporary identifier.

In some embodiments, relocating the first registration of the UE using the first SIM to the MM function includes forwarding the registration request to the MM function, the forwarded registration request including an indication that the registration is associated with the second registration of the UE using the second SIM. In some embodiments, determining whether the MM function can serve the registration request includes determining whether the MM function can serve a list of network slices allowed for the first SIM.

In various embodiments, the network equipment apparatus acts as an AMF serving both SIMs of a multi-SIM UE, where each SIM is registered with the same mobile communication network (e.g., registered with the same PLMN or MNO). In such embodiments, the transceiver 525 may receive a paging request message for a first SIM of a UE, wherein the UE is registered with a mobile communication network using the first SIM and using a second SIM. In such embodiments, the processor 505 identifies an activated service of the second registration of the UE using the second SIM in response to the paging request for the first registration. The processor 505 determines whether to send a paging message towards the UE using the first SIM based on the activated service of the second registration. For example, the processor 505 may selectively send the paging message according to the criteria discussed above.

In certain embodiments, the processor 505 determines to send the paging message to the UE in response to either 1) not having an activated service for the second registration or 2) the priority of the activated service for the second registration is not higher than the priority of the service triggering the paging request. In certain embodiments, the processor 505 determines not to send the paging message in response to a priority of the activated service having a higher priority than a service triggering the paging request.

In some embodiments, the processor 505 identifies a CM state of the second registration in response to the paging request for the first registration, the CM state of the second registration being one of a connected state and an idle state. In such embodiments, the processor 505 may determine to send the paging message to the UE in response to the CM state of the second registration being identified as an idle state.

In certain embodiments, the processor 505 stores an identifier of a second registration in a first MM context corresponding to the first registration and stores an identifier of a first registration in a second MM context corresponding to the second registration, each MM context also storing the CM state and activated service of the respective registration. In certain embodiments, the processor 505 updates the first MM context to a temporarily unreachable state in response to determining not to send the paging message. In further embodiments, the processor 505 reverts the first MM context to a reachable state in response to receiving an indication from the MM function that the second SIM is in an idle state.

In some embodiments, the processor 505 responds to the paging request with an indication of a result of the paging message and a cause value. In certain embodiments, the processor 505 creates service gaps in transmissions for the UE using the second SIM, said service gaps permitting the UE to receive the paging message to the UE using the first SIM. In such embodiments, the service gaps in the transmissions may be based on the identifier of the second registration contained in the paging request and on radio capabilities of the UE.

In various embodiments, the network equipment apparatus 500 acts as a RAN node serving both SIMs of a multi-SIM UE, where each SIM is registered with the same mobile communication network (e.g., registered with the same PLMN or MNO). In such embodiments, the transceiver 525 may receive (e.g., from an AMF) a paging request message for a first SIM of a UE, wherein the UE is registered with a mobile communication network using the first SIM and using a second SIM. In such embodiments, the processor 505 identifies an activated service of the second registration of the UE using the second SIM in response to the paging request for the first registration. The processor 505 determines whether to send a paging message towards the UE using the first SIM based on the activated service of the second registration. For example, the processor 505 may selectively send the paging message according to the criteria discussed above.

In certain embodiments, the processor 505 determines to send the paging message to the UE in response to either 1) not having an activated service for the second registration or 2) the priority of the activated service for the second registration is not higher than the priority of the service triggering the paging request. In certain embodiments, the processor 505 determines not to send the paging message in response to a priority of the activated service having a higher priority than a service triggering the paging request.

In some embodiments, the processor 505 responds to the paging request with an indication of a result of the paging message and a cause value. In certain embodiments, the processor 505 creates service gaps in transmissions for the UE using the second SIM, said service gaps permitting the UE to receive the paging message to the UE using the first SIM. In such embodiments, the service gaps in the transmissions may be based on the identifier of the second registration contained in the paging request and on radio capabilities of the UE.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media. In some embodiments, the memory 510 stores data relating to paging multi-SIM devices in the same network, for example storing UE AS context, UE context, SIM states, and the like. In certain embodiments, the memory 510 also stores program code and related data, such as an operating system ("OS") or other controller algorithms operating on the network equipment apparatus 500 and one or more software applications.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, may include any known electronically controllable display or display device. The output device 520 may be designed to output visual, audible, and/or haptic signals. In some embodiments, the output device 520 includes an electronic display capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, all or portions of the output device 520 may be located near the input device 515.

As discussed above, the transceiver 525 may communicate with one or more remote units and/or with one or more interworking functions that provide access to one or more PLMNs. The transceiver 525 may also communicate with one or more network functions (e.g., in the mobile core network 140). The transceiver 525 operates under the control of the processor 505 to transmit messages, data, and other signals and also to receive messages, data, and other signals. For example, the processor 505 may selectively activate the transceiver (or portions thereof) at particular times in order to send and receive messages.

The transceiver 525 may include one or more transmitters 530 and one or more receivers 535. In certain embodiments, the one or more transmitters 530 and/or the one or more receivers 535 may share transceiver hardware and/or circuitry. For example, the one or more transmitters 530 and/or the one or more receivers 535 may share antenna(s), antenna tuner(s), amplifier(s), filter(s), oscillator(s), mixer(s), modulator/demodulator(s), power supply, and the like. In one embodiment, the transceiver 525 implements multiple logical transceivers using different communication protocols or protocol stacks, while using common physical hardware.

Figure 6:
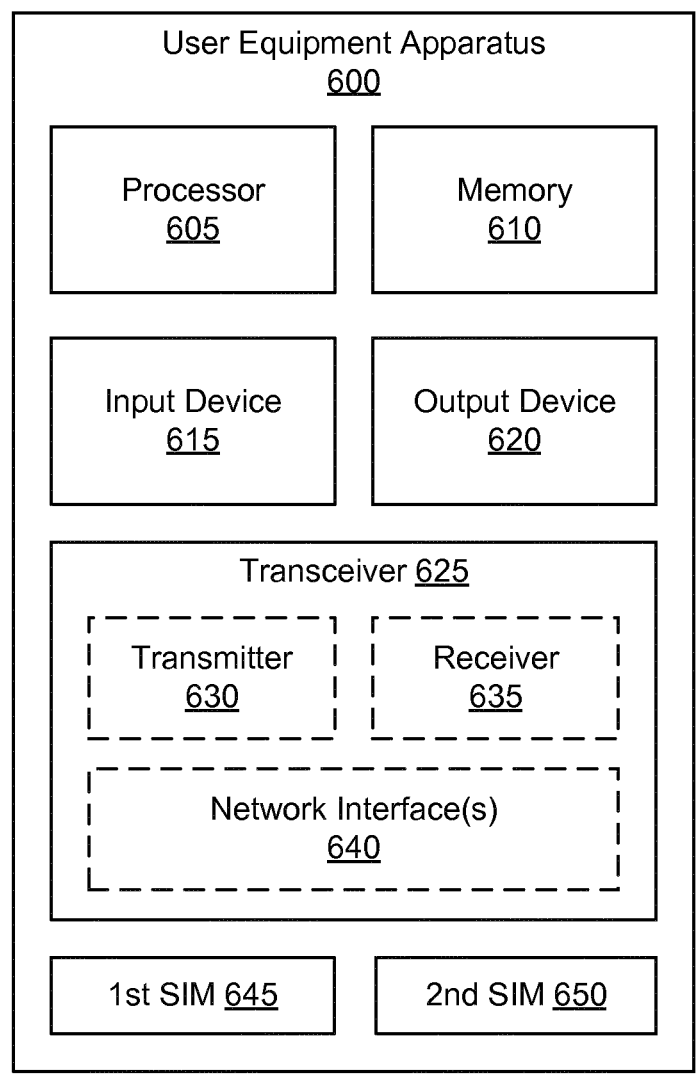
FIG. 6 is a block diagram illustrating one embodiment of a user equipment apparatus for paging multi-SIM devices in the same network.

FIG. 6 depicts one embodiment of a user equipment apparatus 600 that may be used for paging multi-SIM devices in the same network, according to embodiments of the disclosure. The user equipment apparatus 600 may be one embodiment of the remote unit 105. Furthermore, the user equipment apparatus 600 may include a processor 605, a memory 610, an input device 615, an output device 620, a transceiver 625. In some embodiments, the input device 615 and the output device 620 are combined into a single device, such as a touch screen. In certain embodiments, the user equipment apparatus 600 does not include any input device 615 and/or output device 620.

As depicted, the transceiver 625 includes at least one transmitter 630 and at least one receiver 635. Here, the transceiver 625 communicates with a mobile core network (e.g., a 5GC) via an interworking function (e.g., TNGF or N3IWF) and over a non-3GPP access network. Additionally, the transceiver 625 may support at least one network interface 640. Here, the at least one network interface 640 facilitates communication with an eNB or gNB (e.g., using the "Uu" interface). Additionally, the at least one network interface 640 may include an interface used for communications with an UPF, an SMF, and/or a P-CSCF.

The user equipment apparatus 600 includes a plurality of SIMs. In some embodiments, the user equipment apparatus 600 includes a first SIM 645 and a second SIM 650 registered with the same mobile communication network (e.g., same PLMN and/or MNO).

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 registers with a first communication network (e.g., with a first communication network) using the first SIM, wherein the registration with first SIM is associated with a first identifier (e.g., GUTI). The processor 605 also registers with a second communication network (e.g., with a second communication network) using the second SIM. Here, registering the second SIM includes indicating the first identifier to the second communication network upon determining that the first communication network and the second communication network are the same communication network. In various embodiments, the communication network may be a public land mobile network (PLMN) or a non-public network (NPN), or a fixed line network.

In some embodiments, the processor 605 receives (via transceiver 625) a paging message from a communication network (e.g., first PLMN or second PLMN) for one of the first SIM and second SIM, said paging message indicating a service type. In such embodiments, the processor 605 presents a paging indication and the service type to a user upon determining that there is active communication for the other of the first SIM and second SIM. Moreover, the processor 605 selectively accepts the paging message according to user input. In certain embodiments, the processor 605 further requests user consent to reveal the first identifier. In such embodiments, the processor 605 indicates the first identifier to the second communication network in response to user input indicating consent.

In some embodiments, the processor 605 generates a capability indicator using the first SIM and the second SIM. In such embodiments, registering the second SIM includes sending the capability indicator to the second communication network.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media. In some embodiments, the memory 610 stores data relating to paging multi-SIM devices in the same network, for example storing SIM states, and the like. In certain embodiments, the memory 610 also stores program code and related data, such as an operating system ("OS") or other controller algorithms operating on the user equipment apparatus 600 and one or more software applications.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, may include any known electronically controllable display or display device. The output device 620 may be designed to output visual, audible, and/or haptic signals. In some embodiments, the output device 620 includes an electronic display capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, all or portions of the output device 620 may be located near the input device 615.

As discussed above, the transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver (or portions thereof) at particular times in order to send and receive messages.

The transceiver 625 may include one or more transmitters 630 and one or more receivers 635. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an ASIC, or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
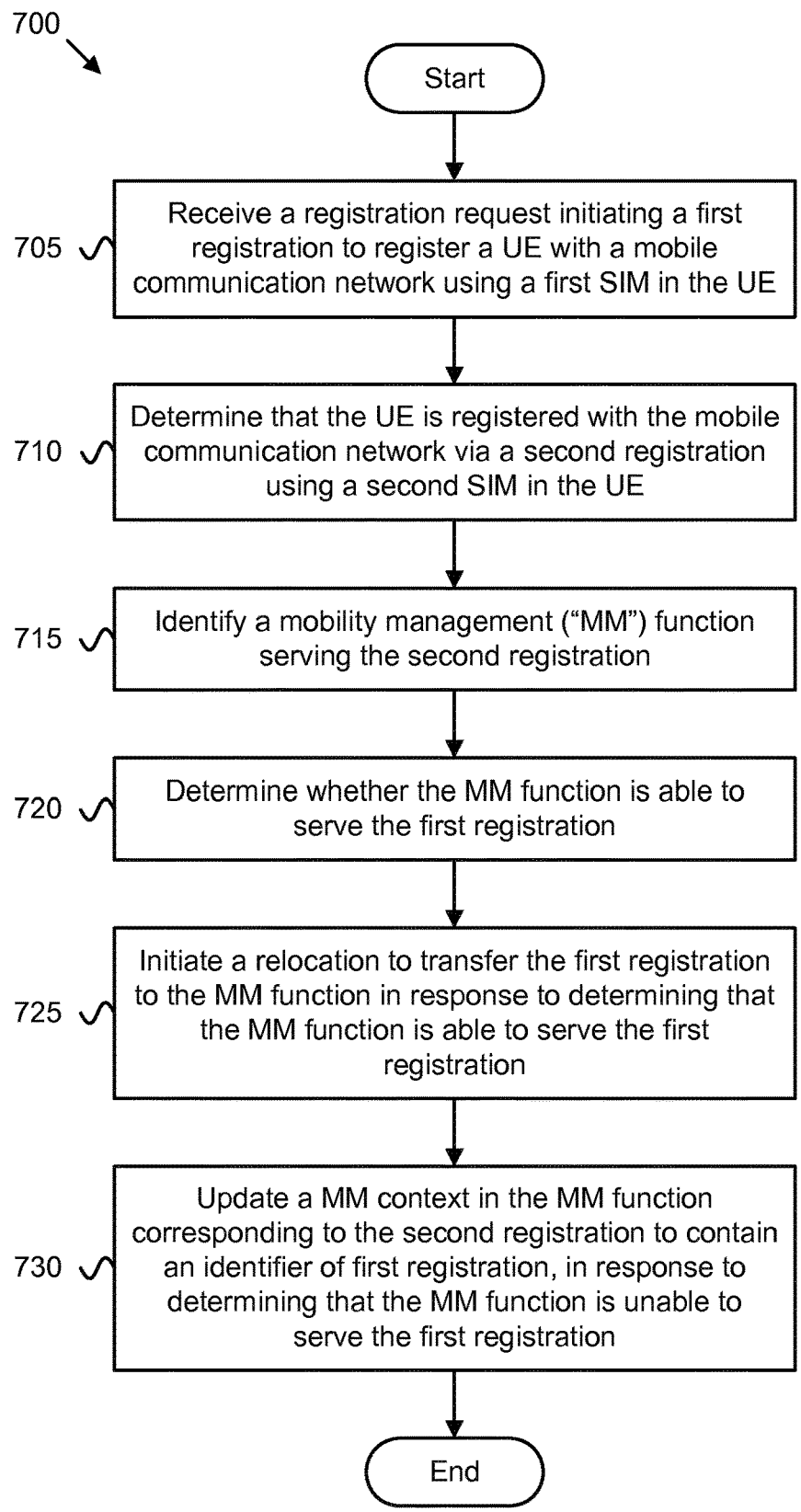
FIG. 7 is a flow chart diagram illustrating one embodiment of a first method for paging multi-SIM devices in the same network.

FIG. 7 depicts a method 700 for paging multi-SIM devices in the same network, according to embodiments of the disclosure. In some embodiments, the method 700 is performed by a network apparatus, such as the AMF 143, the AMF-2 320, and/or the network equipment apparatus 500. In certain embodiments, the method 700 may be performed by a processor executing program code, for example, a microcontroller, a microprocessor, a CPU, a GPU, an auxiliary processing unit, a FPGA, or the like.

The method 700 begins and receives 705 a registration request initiating a first registration to register a UE with a mobile communication network using a first SIM in the UE. The method 700 includes determining 710 that the UE is registered with the mobile communication network via a second registration using a second SIM in the UE.

The method 700 includes identifying 715 a MM function serving the second registration. The method 700 includes determining 720 whether the MM function is able to serve the first registration.

The method 700 includes initiating 725 a relocation to transfer the first registration to the MM function in response to determining that the MM function is able to serve the first registration or updating 730 a MM context in the MM function corresponding to the second registration to contain an identifier of first registration, in response to determining that the MM function is unable to serve the first registration. The method 700 ends.

Figure 8:
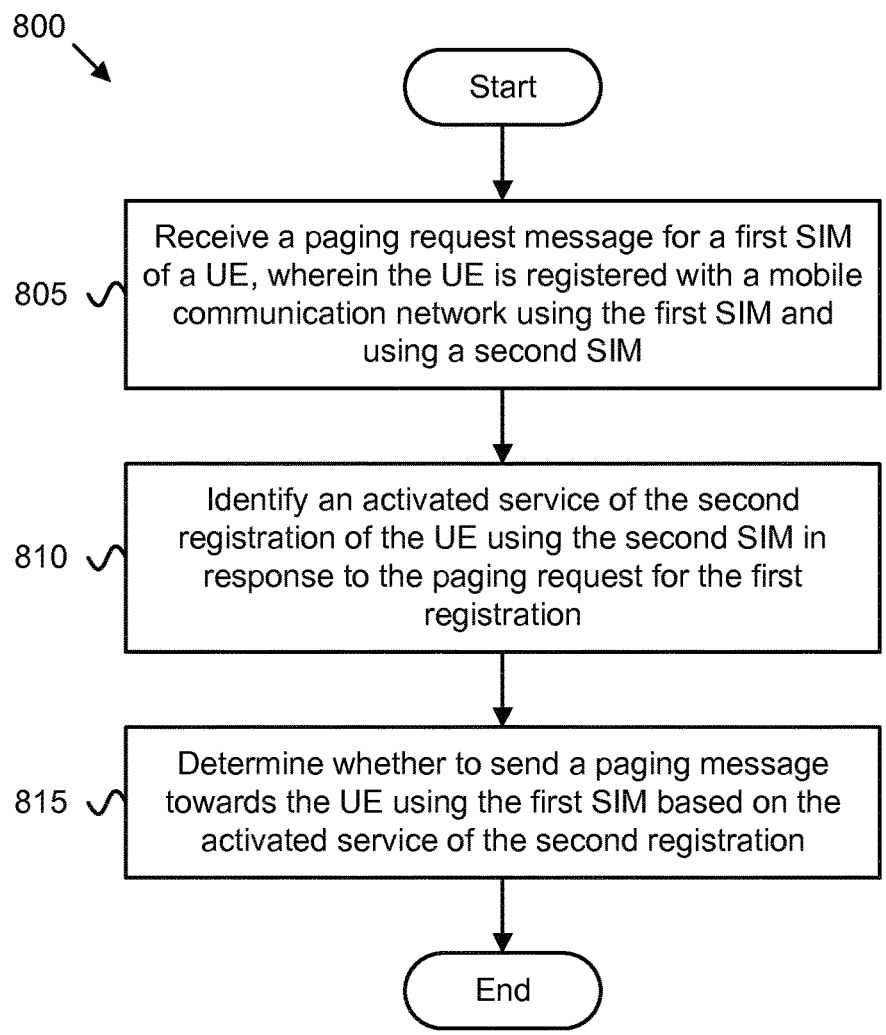
FIG. 8 is a flow chart diagram illustrating one embodiment of a second method for paging multi-SIM devices in the same network.

FIG. 8 depicts a method 800 for paging multi-SIM devices in the same network, according to embodiments of the disclosure. In some embodiments, the method 800 is performed by a network apparatus, such as the base unit 121, the AMF 143, the AMF-1 315, the RAN node 310, the network equipment apparatus 500, a gNB, and/or an eNB. In certain embodiments, the method 800 may be performed by a processor executing program code, for example, a microcontroller, a microprocessor, a CPU, a GPU, an auxiliary processing unit, a FPGA, or the like.

The method 800 begins and receives 805 a paging request message for a first SIM of a UE, wherein the UE is registered with a mobile communication network using the first SIM and using a second SIM. The method 800 includes identifying 810 an activated service of the second registration of the UE using the second SIM in response to the paging request for the first registration. The method 800 includes determining 815 whether to send a paging message towards the UE using the first SIM based on the activated service of the second registration. The method 800 ends.

Figure 9:
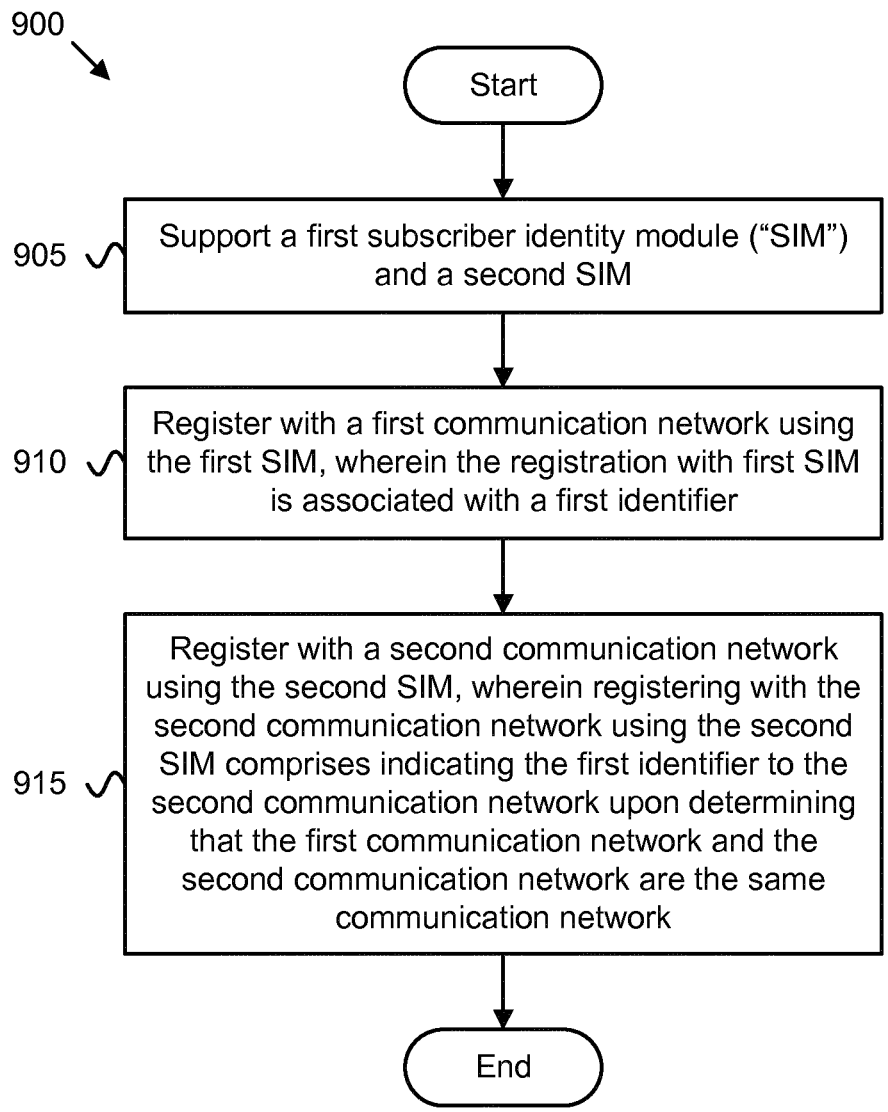
FIG. 9 is a flow chart diagram illustrating one embodiment of a third method for paging multi-SIM devices in the same network.

FIG. 9 depicts a method 900 for paging multi-SIM devices in the same network, according to embodiments of the disclosure. In some embodiments, the method 900 is performed by an apparatus, such as the remote unit 105, the multi-SIM UE 205, and/or the user equipment apparatus 600. In certain embodiments, the method 900 may be performed by a processor executing program code, for example, a microcontroller, a microprocessor, a CPU, a GPU, an auxiliary processing unit, a FPGA, or the like.

The method 900 begins and supports 905 a first SIM and a second SIM. The method 900 includes registering 910 with a first communication network using the first SIM, wherein the registration with first SIM is associated with a first identifier. The method 900 includes registering 915 with a second communication network using the second SIM. Here, registering 915 the second SIM includes indicating the first identifier to the second communication network upon determining that the first communication network and second communication network are the same communication network. The method 900 ends.

Disclosed herein is a first apparatus for paging multi-SIM devices in the same network, according to embodiments of the disclosure. The first apparatus may be implemented by a network function, such as the AMF 143, AMF-2 320, and/or the network equipment apparatus 500. The first apparatus includes a processor and a transceiver that receives a registration request initiating a first registration to register a UE with a mobile communication network using a first SIM in the UE. The processor determines that the UE is registered with the mobile communication network via a second registration using a second SIM in the UE and identifies a MM function serving the second registration. The processor determines whether the MM function is able to serve the first registration and initiates a relocation to transfer the first registration to the MM function in response to determining that the MM function is able to serve the first registration. Otherwise, the processor updates a MM context in the MM function corresponding to the second registration to contain an identifier of first registration, in response to determining that the MM function is unable to serve the first registration.

In some embodiments, the processor stores an identifier of the second registration in an MM context corresponding to the first registration. In certain embodiments, the processor determines that the UE using the first SIM needs to be paged after updating the MM context in the MM function. In such embodiments, the processor identifies a CM state of the MM context in the MM function, the CM state being one of a connected state and an idle state and determines whether to send a paging message towards the UE based on the CM state of the UE with respect to the second SIM.

In certain embodiments, the processor sends the paging message to an access network node serving the UE in response to the CM state being identified as an idle state. In other embodiments, the CM state is identified as a connected state. Here, determining whether to send a paging message towards the UE may include identifying an activated service of the UE using the second SIM. In such embodiments, the processor determines not to send the paging message in response to a priority of the activated service having a higher priority than a service triggering the paging request. Additionally, the processor may determine to send the paging message to an access network node serving the UE using the first SIM in response to priority of the activated service not having a higher priority than the service triggering the paging request. Here, the paging message includes an identifier of the second registration.

In certain embodiments, the processor updates an MM context corresponding to the first registration to a temporarily unreachable state in response to determining not to send the paging message. Moreover, the processor may revert the MM context corresponding to the first registration to a reachable state in response to receiving an indication from the MM function that the CM state is an idle state. In certain embodiments, identifying the CM state includes requesting state information for the second SIM from the MM function in response to receiving the paging request, wherein the state information for the second SIM includes the CM state and an activated service of the UE associated with the second SIM.

In some embodiments, the processor further subscribes to receive notifications upon change of a CM state. In further embodiments, the processor may subscribe to receive notifications upon change of an identifier assigned to the second SIM in response to the MM function being unable to serve the registration request. In some embodiments, the registration request includes a second identifier identifying the second registration of the UE using the second SIM in a MM function; and wherein the identification of the MM function is contained in the second identifier.

In some embodiments, relocating the first registration of the UE using the first SIM to the MM function includes forwarding the registration request to the MM function, the forwarded registration request including an indication that the registration is associated with the second registration of the UE using the second SIM. In some embodiments, determining whether the MM function can serve the registration request includes determining whether the MM function can serve a list of network slices allowed for the first SIM.

Disclosed herein is a first method for paging multi-SIM devices in the same network, according to embodiments of the disclosure. The first method may be performed by a network function, such as the AMF 143, the AMF-2 320, and/or the network equipment apparatus 500. The first method includes receiving a registration request initiating a first registration to register a UE with a communication network using a first SIM in the UE and determining that the UE is registered with the communication network via a second registration using a second SIM in the UE. The first method includes identifying a MM function serving the second registration and determining whether the MM function is able to serve the first registration. The first method includes initiating a relocation to transfer the first registration to the MM function in response to determining that the MM function is able to serve the first registration and updating a MM context in the MM function corresponding to the second registration to contain an identifier of first registration, in response to determining that the MM function is unable to serve the first registration.

In some embodiments, the first method includes storing an identifier of the second registration in an MM context corresponding to the first registration. In some embodiments, the first method includes determining that the UE using the first SIM needs to be paged after updating the MM context in the MM function and identifying a CM state of the MM context in the MM function, the CM state being one of a connected state and an idle state. Here, the first method may further include determining whether to send a paging message towards the UE based on the CM state of the UE with respect to the second SIM.

In some embodiments, the first method includes sending the paging message to an access network node serving the UE in response to the CM state being identified as an idle state. In certain embodiments, the CM state is identified as a connected state, wherein determining whether to send a paging message towards the UE includes identifying an activated service of the UE using the second SIM. Here, the first method further includes determining not to send the paging message in response to a priority of the activated service having a higher priority than a service triggering the paging request and determining to send the paging message to an access network node serving the UE using the first SIM in response to priority of the activated service not having a higher priority than the service triggering the paging request, wherein the paging message includes the identifier of the second registration.

In some embodiments, the first method includes updating an MM context corresponding to the first registration to a temporarily unreachable state in response to determining not to send the paging message. In such embodiments, the first method may further include reverting the MM context of the first SIM to a reachable state in response to receiving an indication from the MM function that the CM state is an idle state. In some embodiments, the first method includes identifying the CM state includes requesting state information for the second SIM from the MM function in response to receiving the paging request, wherein the state information for the second SIM includes the CM state and an activated service of the UE associated with the second SIM.

In some embodiments, the first method includes subscribing to receive notifications upon change of a CM state. In some embodiments, the first method includes subscribing to receive notifications upon change of an identifier assigned to the second SIM in response to the MM function being unable to serve the registration request. In certain embodiments, the registration request includes a second identifier identifying the second registration of the UE using the second SIM in a MM function; and wherein the identification of the MM function is contained in the second identifier.

In certain embodiments, relocating the first registration of the UE using the first SIM to the MM function includes forwarding the registration request to the MM function, the forwarded registration request including an indication that the registration is associated with the second registration of the UE using the second SIM. In certain embodiments, determining whether the MM function can serve the registration request includes determining whether the MM function can serve a list of network slices allowed for the first SIM.

Disclosed herein is a second apparatus for paging multi-SIM devices in the same network, according to embodiments of the disclosure. The second apparatus may be implemented by a network function or RAN node, such as the base unit 121, the AMF 143, the RAN node 310, the AMF-1 315, and/or the network equipment apparatus 500. The second apparatus includes a transceiver that receives a paging request message for a first SIM of a UE, wherein the UE is registered with a communication network using the first SIM and using a second SIM. The second apparatus includes a processor that identifies an activated service of the second registration of the UE using the second SIM in response to the paging request for the first registration and determines whether to send a paging message towards the UE using the first SIM based on the activated service of the second registration.

In certain embodiments, determining whether to send the paging message includes the processor A) determining to send the paging message to the UE in response to either 1) not having an activated service for the second registration or 2) the priority of the activated service for the second registration is not higher than the priority of the service triggering the paging request; and B) determining not to send the paging message in response to a priority of the activated service having a higher priority than a service triggering the paging request.

In some embodiments, the processor identifies a CM state of the second registration in response to the paging request for the first registration, the CM state of the second registration being one of a connected state and an idle state. In such embodiments, the processor may determine to send the paging message to the UE in response to the CM state of the second registration being identified as an idle state.

In certain embodiments, the processor stores an identifier of a second registration in a first MM context corresponding to the first registration and stores an identifier of a first registration in a second MM context corresponding to the second registration, each MM context also storing the CM state and activated service of the respective registration. In certain embodiments, the processor updates the first MM context to a temporarily unreachable state in response to determining not to send the paging message. In further embodiments, the processor reverts the first MM context to a reachable state in response to receiving an indication from the MM function that the second SIM is in an idle state.

In some embodiments, the processor responds to the paging request with an indication of a result of the paging message and a cause value. In certain embodiments, the processor creates service gaps in transmissions for the UE using the second SIM, said service gaps permitting the UE to receive the paging message to the UE using the first SIM. In such embodiments, the service gaps in the transmissions may be based on the identifier of the second registration contained in the paging request and on radio capabilities of the UE.

Disclosed herein is a second method for paging multi-SIM devices in the same network, according to embodiments of the disclosure. The second method may be performed by a network function or RAN node, such as the base unit 121, the AMF 143, the RAN node 310, the AMF-1 315, and/or the network equipment apparatus 500. The second method includes receiving a paging request message for a first SIM of a UE, wherein the UE is registered with a communication network using the first SIM and using a second SIM. The second method includes identifying an activated service of the second registration of the UE using the second SIM in response to the paging request for the first registration and determining whether to send a paging message towards the UE using the first SIM based on the activated service of the second registration.

In certain embodiments, determining whether to send the paging message includes: A) determining to send the paging message to the UE in response to either 1) not having an activated service for the second registration or 2) the priority of the activated service for the second registration is not higher than the priority of the service triggering the paging request, and B) determining not to send the paging message in response to a priority of the activated service having a higher priority than a service triggering the paging request.

In some embodiments, the second method includes identifying a CM state of the second registration in response to the paging request for the first registration, the CM state of the second registration being one of: a connected state and an idle state, wherein determining whether to send a paging message towards the UE includes determining to send the paging message to the UE in response to the CM state of the second registration being identified as an idle state.

In some embodiments, the second method includes storing an identifier of a second registration in a first MM context corresponding to the first registration and storing an identifier of a first registration in a second MM context corresponding to the second registration, each MM context also storing the CM state and activated service of the respective registration.

In some embodiments, the second method includes updating the first MM context to a temporarily unreachable state in response to determining not to send the paging message. In further embodiments, the second method includes reverting the first MM context to a reachable state in response to receiving an indication from the MM function that the second SIM is in an idle state. In some embodiments, the second method includes responding to the paging request with an indication of a result of the paging message and a cause value.

In some embodiments, the second method includes creating service gaps in the transmissions for the UE using the second SIM in order to allow the UE to receive the paging message to the UE using the first SIM. In such embodiments, the service gaps in the transmissions may be based on the identifier of the second registration contained in the paging request and on radio capabilities of the UE.

Disclosed herein is a third apparatus for paging multi-SIM devices in the same network, according to embodiments of the disclosure. The third apparatus may be implemented by a UE, such as the remote unit 105, the MUSIM 205, and/or the user equipment apparatus 600. The third apparatus includes a first SIM, a second SIM, a processor, and a transceiver that communicates with the communication network. In various embodiments, the processor registers with a first communication network using the first SIM, wherein the registration with first SIM is associated with a first identifier. The processor also registers with a second communication network using the second SIM. Here, registering the second SIM includes indicating the first identifier to the second communication network upon determining that the first communication network and the second communication network are the same communication network.

In some embodiments, the processor receives (via the transceiver) a paging message from a communication network for one of the first SIM and second SIM, said paging message indicating a service type. In such embodiments, the processor presents a paging indication and the service type to a user upon determining that there is active communication for the other of the first SIM and second SIM. Moreover, the processor selectively accepts the paging message according to user input.

In certain embodiments, the processor further requests user consent to reveal the first identifier. In such embodiments, the processor indicates the first identifier to the second communication network in response to user input indicating consent.

In some embodiments, the processor generates a capability indicator using the first SIM and the second SIM. In such embodiments, registering the second SIM includes sending the capability indicator to the second communication network.

Disclosed herein is a third method for paging multi-SIM devices in the same network, according to embodiments of the disclosure. The third method may be performed by a UE, such as the remote unit 105, the MUSIM 205, and/or the user equipment apparatus 600. The third method includes supporting a first SIM and a second SIM, registering the first SIM with a communication network, wherein the registration with first SIM is associated with a first identifier, and registering with a second communication network using the second SIM with the communication network, wherein registering with the second communication network using the second SIM includes indicating the first identifier to the communication network upon determining that the first communication network and the second communication network are the same communication network.

In some embodiments, the third method includes receiving a paging message from a communication network for one of the first SIM and second SIM, said paging message indicating a service type, presenting a paging indication and the service type to a user upon determining that there is active communication for the other of the first SIM and second SIM, and selectively accepting the paging message according to user input.

In further embodiments, the third method may include requesting user consent to reveal the first identifier. In such embodiments, indicating the first identifier to the second occurs in response to user input indicating consent.

In certain embodiments, the third method may include generating a capability indicator using the first SIM and the second SIM. In such embodiments, registering the second SIM includes sending the capability indicator to the second.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   at least one memory; and
   at least one processor coupled with the at least one memory and configured to cause the apparatus to:
   receive a registration request initiating a first registration to register a user equipment ("UE") with a communication network using a first subscriber identity module ("SIM") of the UE;
   determine that the UE is registered with the communication network via a second registration using a second SIM in of the UE;
   identify a mobility management ("MM") function serving the second registration;
   determine whether the MM function is able to serve the first registration;
   initiate a relocation to transfer the first registration to the MM function in response to determining that the MM function is able to serve the first registration; and
   update an MM context in the MM function corresponding to the second registration to contain an identifier of the first registration, in response to determining that the MM function is unable to serve the first registration.

2. The apparatus of claim 1, wherein the at least one processor is configured to cause the apparatus to store an identifier of the second registration in an MM context corresponding to the first registration.

3. The apparatus of claim 1, wherein the at least one processor is configured to cause the apparatus to:
   determine that the UE using the first SIM needs to be paged after updating the MM context in the MM function;
   identify a connection management ("CM") state of the MM context in the MM function, the CM state being one of a connected state and an idle state; and
   determine whether to transmit a paging message towards the UE based on the CM state of the UE with respect to the second SIM.

4. The apparatus of claim 3, wherein the at least one processor is configured to cause the apparatus to transmit the paging message to an access network node serving the UE in response to the CM state being identified as an idle state.

5. The apparatus of claim 3, wherein the CM state is identified as a connected state, wherein to determine whether to transmit the paging message towards the UE, the at least one processor is configured to cause the apparatus to identify an activated service of the UE using the second SIM, wherein the at least one processor is configured to cause the apparatus to:
   determine not to transmit the paging message in response to a priority of the activated service having a higher priority than a service triggering the paging message; and
   determine to transmit the paging message to an access network node serving the UE using the first SIM in response to priority of the activated service not having a higher priority than the service triggering the paging message,
   wherein the paging message comprises an identifier of the second registration.

6. The apparatus of claim 3, wherein to identify the CM state, the at least one processor is configured to cause the apparatus to request state information for the second SIM from the MM function in response to receiving the paging message, wherein the state information for the second SIM comprises the CM state and an activated service of the UE associated with the second SIM.

7. The apparatus of claim 5, wherein the at least one processor is configured to cause the apparatus to update an MM context corresponding to the first registration to a temporarily unreachable state in response to determining not to transmit the paging message.

8. The apparatus of claim 7, wherein the at least one processor is configured to cause the apparatus to revert the MM context corresponding to the first registration to a reachable state in response to receiving an indication from the MM function that the CM state is an idle state.

9. The apparatus of claim 1, wherein the at least one processor is configured to cause the apparatus to subscribe to receive notifications upon a change of a connection management ("CM") state.

10. The apparatus of claim 1, wherein the at least one processor is configured to cause the apparatus to subscribe to receive notifications upon a change of an identifier assigned to the second SIM in response to the MM function being unable to serve the registration request.

11. The apparatus of claim 1, wherein the registration request includes a second identifier identifying the second registration of the UE using the second SIM in a MM function; and wherein the identification of the MM function is contained in the second identifier.

12. The apparatus of claim 1, wherein to relocate the first registration of the UE using the first SIM to the MM function, the at least one processor is configured to cause the apparatus to forward the registration request to the MM function, the forwarded registration request including an indication that the registration is associated with the second registration of the UE using the second SIM.

13. The apparatus of claim 1, wherein to determine whether the MM function can serve the registration request, the at least one processor is configured to cause the apparatus to determine comprises determining whether the MM function can serve a list of network slices allowed for the first SIM.

14. A method comprising:
   receiving a registration request initiating a first registration to register a user equipment ("UE") with a communication network using a first subscriber identity module ("SIM") in of the UE;
   determining that the UE is registered with the communication network via a second registration using a second SIM in of the UE;

identifying a mobility management ("MM") function serving the second registration;

determining whether the MM function is able to serve the first registration;

initiating a relocation to transfer the first registration to the MM function in response to determining that the MM function is able to serve the first registration; and updating an MM context in the MM function corresponding to the second registration to contain an identifier of the first registration, in response to determining that the MM function is unable to serve the first registration.

15. The method of claim 14, further comprising:

determining that the UE using the first SIM needs to be paged after updating the MM context in the MM function;

identifying a connection management ("CM") state of the MM context in the MM function, the CM state being one of a connected state and an idle state; and determining whether to transmit a paging message towards the UE based on the CM state of the UE with respect to the second SIM.

16. The method of claim 14, further comprising storing an identifier of the second registration in an MM context corresponding to the first registration.

17. The method of claim 16, further comprising transmitting a paging message to an access network node serving the UE in response to a connection management ("CM") state being identified as an idle state.

18. The method of claim 15, wherein the CM state is identified as a connected state, wherein determining whether to transmit the paging message towards the UE identifying an activated service of the UE using the second SIM, the method further comprising:

determining not to transmit the paging message in response to a priority of the activated service having a higher priority than a service triggering the paging message; and determining to transmit the paging message to an access network node serving the UE using the first SIM in response to priority of the activated service not having a higher priority than the service triggering the paging message, wherein the paging message comprises an identifier of the second registration.

19. The method of claim 18, further comprising updating an MM context corresponding to the first registration to a temporarily unreachable state in response to determining not to transmit the paging message.

20. The method of claim 19, further comprising reverting the MM context corresponding to the first registration to a reachable state in response to receiving an indication from the MM function that the CM state is an idle state.

* * * * *